(12) United States Patent
Rangaprasad et al.

(10) Patent No.: US 11,842,236 B2
(45) Date of Patent: Dec. 12, 2023

(54) COLORED VISUAL MARKERS FOR VARIABLE USE

(71) Applicant: Apple Inc., Cupertino, CA (US)

(72) Inventors: Arun Srivatsan Rangaprasad, Sunnyvale, CA (US); Anselm Grundhoefer, Saratoga, CA (US); Dhruv A. Govil, San Mateo, CA (US)

(73) Assignee: Apple Inc., Cupertino, CA (US)

( * ) Notice: Subject to any disclaimer, the term of this patent is extended or adjusted under 35 U.S.C. 154(b) by 182 days.

(21) Appl. No.: 17/087,723

(22) Filed: Nov. 3, 2020

(65) Prior Publication Data

US 2021/0150295 A1 May 20, 2021

Related U.S. Application Data

(60) Provisional application No. 63/003,457, filed on Apr. 1, 2020, provisional application No. 62/935,747, filed on Nov. 15, 2019.

(51) Int. Cl.
*G06F 3/04847* (2022.01)
*G06K 19/06* (2006.01)
(Continued)

(52) U.S. Cl.
CPC ... *G06K 19/06037* (2013.01); *G06F 3/04842* (2013.01); *G06F 3/04847* (2013.01); *G06T 7/80* (2017.01); *G06T 2207/10024* (2013.01)

(58) Field of Classification Search
CPC .......... G06K 19/06037; G06K 19/0614; G06F 3/04842; G06F 3/04847; G06F 3/04817;
(Continued)

(56) References Cited

U.S. PATENT DOCUMENTS 8,116,582 B2 2/2012 Erol
8,313,030 B2 11/2012 Zolotov
(Continued)

FOREIGN PATENT DOCUMENTS

EP 2 395 459 12/2011

OTHER PUBLICATIONS

Tancik, Matthew; Mildenhall, Ben, and Ng, Ren; "StegaStamp: Invisible Hyperlinks in Physical Photographs", arXiv:1904.05343v1 [cs.CV] Apr. 10, 2019, pp. 1-10.
(Continued)

*Primary Examiner* — Hien L Duong
(74) *Attorney, Agent, or Firm* — Thompson Hine LLP

(57) ABSTRACT

Various implementations disclosed herein include devices, systems, and methods that select colors for visual markers that include colored markings encoding data. In some implementations, the colors are automatically or semi-automatically selected. In some implementations, the colors are selected to remain sufficiently detectable despite changes in lighting conditions or printing/display conditions. In some implementations, a set of colors selectable for use in a visual marker is obtained. Then, measures of distance between a plurality of colors of the set of colors is determined, and a subset of the set of colors for the visual marker is selected based on the measure of distance between colors of the subset of colors. In some implementations, the visual marker appearance includes graphical elements encoding data using the subset of colors. In some implementations, input is received using a GUI on a display to determine multiple colors based on a source image.

20 Claims, 15 Drawing Sheets

(51) Int. Cl.
*G06T 7/80* (2017.01)
*G06F 3/04842* (2022.01)

(58) Field of Classification Search
CPC .............. G06F 3/04845; G06T 7/80; G06T 2207/10024; G06T 2207/30204; G06T 7/90
See application file for complete search history.

(56) References Cited

U.S. PATENT DOCUMENTS

| | | | |
|---|---|---|---|
| RE44,982 E | 7/2014 | Cheong et al. | |
| 9,111,186 B2 * | 8/2015 | Blasinski | G06K 19/0614 |
| 10,496,862 B1 | 12/2019 | Walters et al. | |
| 10,530,967 B1 * | 1/2020 | Frank | G06K 9/6223 |
| 10,672,049 B1 * | 6/2020 | Biggs | G06Q 30/0621 |
| 10,805,587 B1 * | 10/2020 | Wilfred | H04N 9/73 |
| 2006/0072779 A1 * | 4/2006 | Erol | G06T 11/60 382/306 |
| 2008/0095363 A1 * | 4/2008 | DiCarto | H04N 9/3179 348/E9.027 |
| 2011/0216966 A1 * | 9/2011 | Cok | G06T 11/001 382/162 |
| 2012/0321759 A1 * | 12/2012 | Marinkovich | A61B 5/442 356/402 |
| 2013/0343645 A1 * | 12/2013 | Dalal | G06K 7/1408 382/162 |
| 2017/0344776 A1 * | 11/2017 | Sharma | G06K 19/06112 |
| 2018/0160501 A1 * | 6/2018 | Magielse | H05B 47/10 |
| 2019/0378249 A1 * | 12/2019 | Rathore | G06T 5/50 |
| 2020/0104663 A1 * | 4/2020 | Webster | G06K 19/06037 |
| 2020/0394481 A1 * | 12/2020 | Brandt | G06K 19/06075 |
| 2021/0042487 A1 * | 2/2021 | Benito Altamirano | G06T 5/007 |

OTHER PUBLICATIONS

Bergamasco, Fliippo; Albarelli, Andrea; Rodola, Emanuele; and Torsello, Andrea; "RUNE-Tag: A High Accuracy Fiducial Marker with Strong Occlusion Resilience", May 17, 2012; pp. 1-40.

Yang, Zhibo; Xu, Huanle; Deng, Jianyuan; Loy, Chen Change; and Lau, Wing Cheong; "Robust and Fast Decoding of High-Capacity Color QR Codes for Mobile Applications"; arXiv1704.064473v3 [cs.CV] May 19, 2018, pp. 1-16.

Kato, Hiroko; Tan, Keng T.; and Chai, Douglas; "Novel Colour Selections Scheme for 2D Barcode"; 2009 International Symposium on Intelligent Signal Processing and Communication Systmes (ISPACS 2009) Dec. 7-9, 2009; pp. 529-532.

Shimizu, Takuma; Isami, Mariko; Terada, Kenji; Ohyama, Wataru; Wakabayashi, Tetsushi; and Kimura, Fumitaka; "Color Recognition by Extended Color Space Method for 64-color 2-D Barcode"; MVA2011 [APR Conference on Machine Vision Applications] Jun. 13-15, 2011, Nara, JAPAN; pp. 259-262.

DeGol, Joseph; Bretl, Timothy; and Hoiem, Derek; "Chroma Tag: A Colored Marker and Fast Detection Algorithm"; University of Illinois Urbana-Champaign; arXiv:1708.02982v1 [cs.CV] Aug. 9, 2017; pgs.

Bagherinia, H.; and Manduchi, R.; "A Theory of Color Barcodes"; US Santa Cruz Previously Published Works; Dec. 1, 2011; pp. 1-10.

* cited by examiner

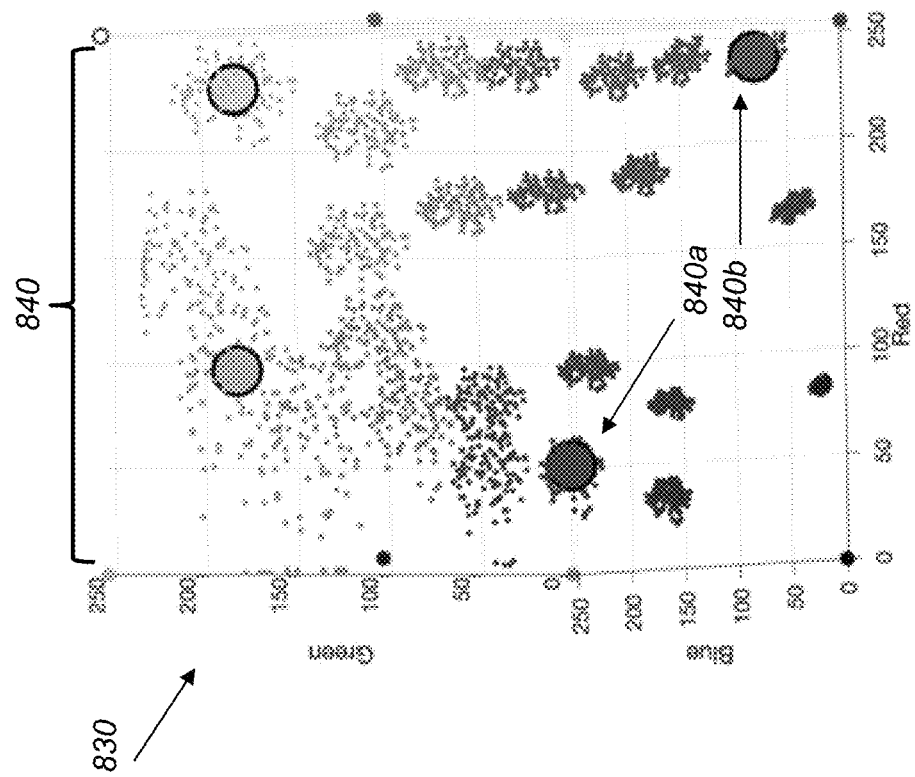
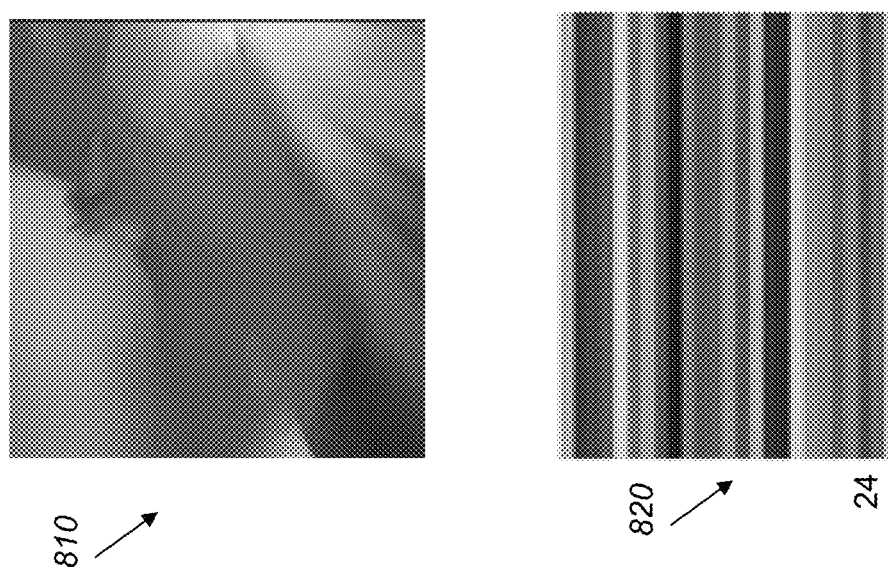
FIGURE 8

COLORED VISUAL MARKERS FOR VARIABLE USE

CROSS-REFERENCE TO RELATED APPLICATIONS

This Application claims the benefit of U.S. Provisional Application Ser. No. 62/935,747 filed Nov. 15, 2019, and U.S. Provisional Application Ser. No. 63/003,457 filed Apr. 1, 2020, each of which is incorporated herein in its entirety.

TECHNICAL FIELD

The present disclosure generally relates to electronic devices, and in particular, to systems, methods, and devices that select colors for visual markers.

BACKGROUND

Visual markers exist today in the form of barcodes, Quick Response (QR) codes, and other proprietary code-based systems. QR codes encode binary data such as strings or other payloads to initiate payments, link to websites, link to location-based experiences or contextual-based experiences, or launch into other web-based experiences.

SUMMARY

Various implementations disclosed herein include devices, systems, and methods that determine multiple colors (e.g., 2-8) for a visual marker that encodes data using colored markings. In some implementations, the visual marker colors are selected to remain detectable despite wide variations in lighting conditions or printing/display conditions. In some implementations, an initial set of colors are obtained. For example, the initial set of colors can be based on an input image such as the image of the physical environment where the visual marker will be deployed. Alternatively, the initial set of colors can be based on colors of an object (e.g., poster) on which the visual marker will be mounted. In another example, the initial set of colors are randomly generated or provided by a visual marker designer. Given the initial set of colors, in some implementations, the multiple colors (e.g., 2-8) for the visual marker are automatically determined (or the user is guided to select) based on a separation of the multiple colors in color space. The determined multiple colors may be the most invariant or sufficiently invariant to changes in lighting conditions or printing/display conditions (e.g., sufficiently separated in a 3D color space by a minimum preset distance or a spatial separation threshold such that the colors can be distinguished from one another in different conditions). In some implementations, the multiple color selection can also take into account image sensor (e.g., camera) characteristics or calibrations when determining the multiple colors.

In some implementations, at an electronic device having a processor, a set of colors selectable for use in a visual marker is determined. Then, measures of distance between a plurality of colors of the set of colors is determined, and a subset of the set of colors for the visual marker is selected based on the measure of distance between colors of the subset of colors. In some implementations, an appearance of the visual marker is generated based on the subset of colors. In some implementations, the visual marker appearance includes graphical elements encoding data using the subset of colors.

Various implementations disclosed herein include devices, systems, and methods that determine multiple colors based on a source image for visual markers that encode data using color. In some implementations, a user selects a type of visual marker template, and position and size on a background or the source image. In some implementations, the user previews the colored visual marker. In some implementations, a colored visual marker is generated that includes colored markings (e.g., size, shape, color, or orientation of graphical elements) encoding data using the determined colors. In some implementations, input from a designer is received using a GUI on a display. In some implementations, the colors are semi-automatically or automatically selected to remain sufficiently detectable despite changes in lighting conditions or printing/display conditions. In some implementations, the colored visual marker is generated, stored, printed, or displayed, at a selectable resolution.

In some implementations, at an electronic device having a processor, input selecting a source image is received. In some implementations, colors based on the source image are determined. In some implementations, a visual marker and encoding data using the determined colors are generated. In some implementations, a preview including the source image and the colored visual marker is displayed.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 8 is a diagram illustrating exemplary clusters resulting from grouping points in a 3D color space that result from adjusting an initial set of colors for lighting conditions, printing or displaying conditions, or image sensor calibration in accordance with some implementations.

Figure 1:
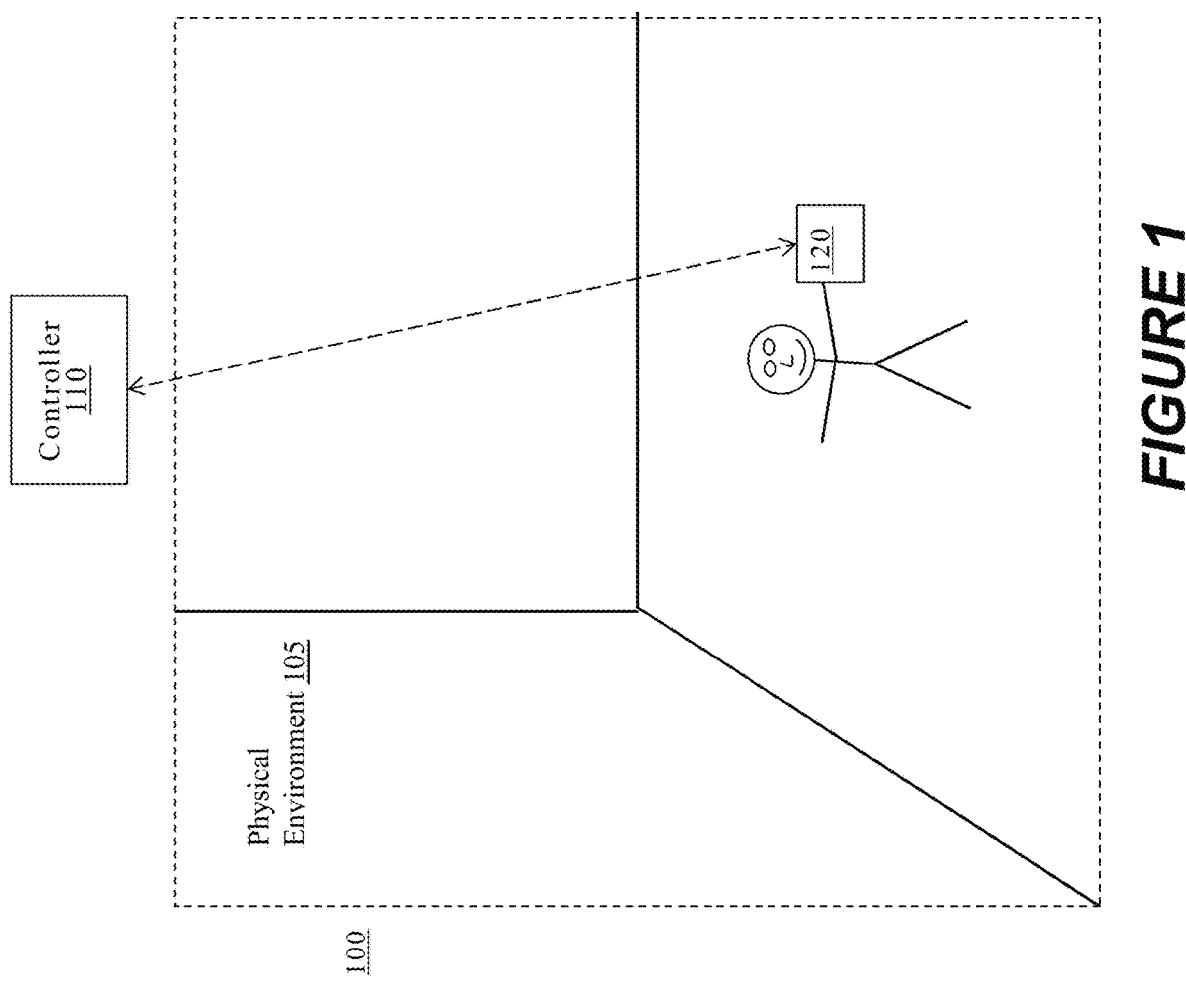
FIG. 1 is a block diagram of an example operating environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Figure 2:
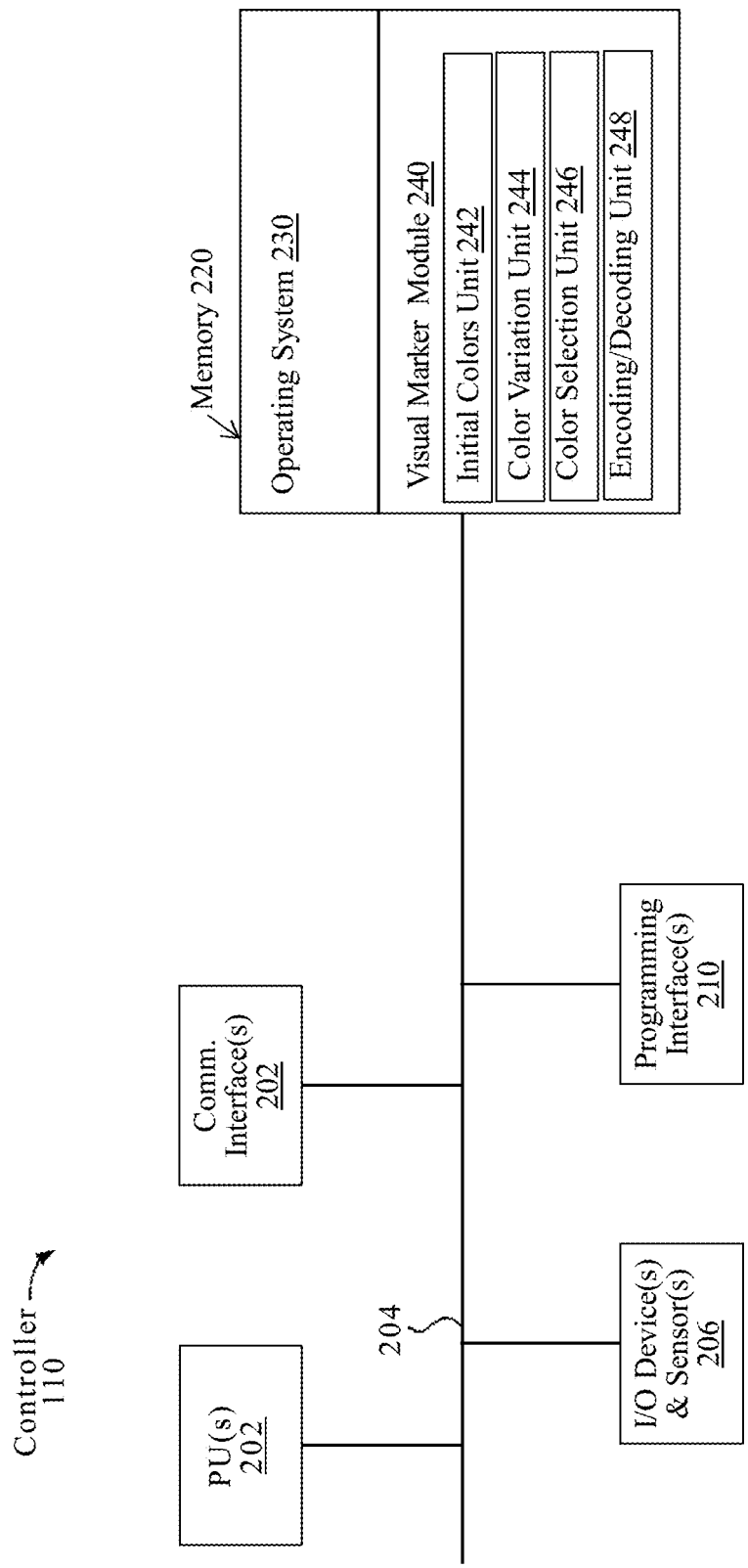
FIG. 2 is a block diagram of an example controller in accordance with some implementations.
Figure 3:
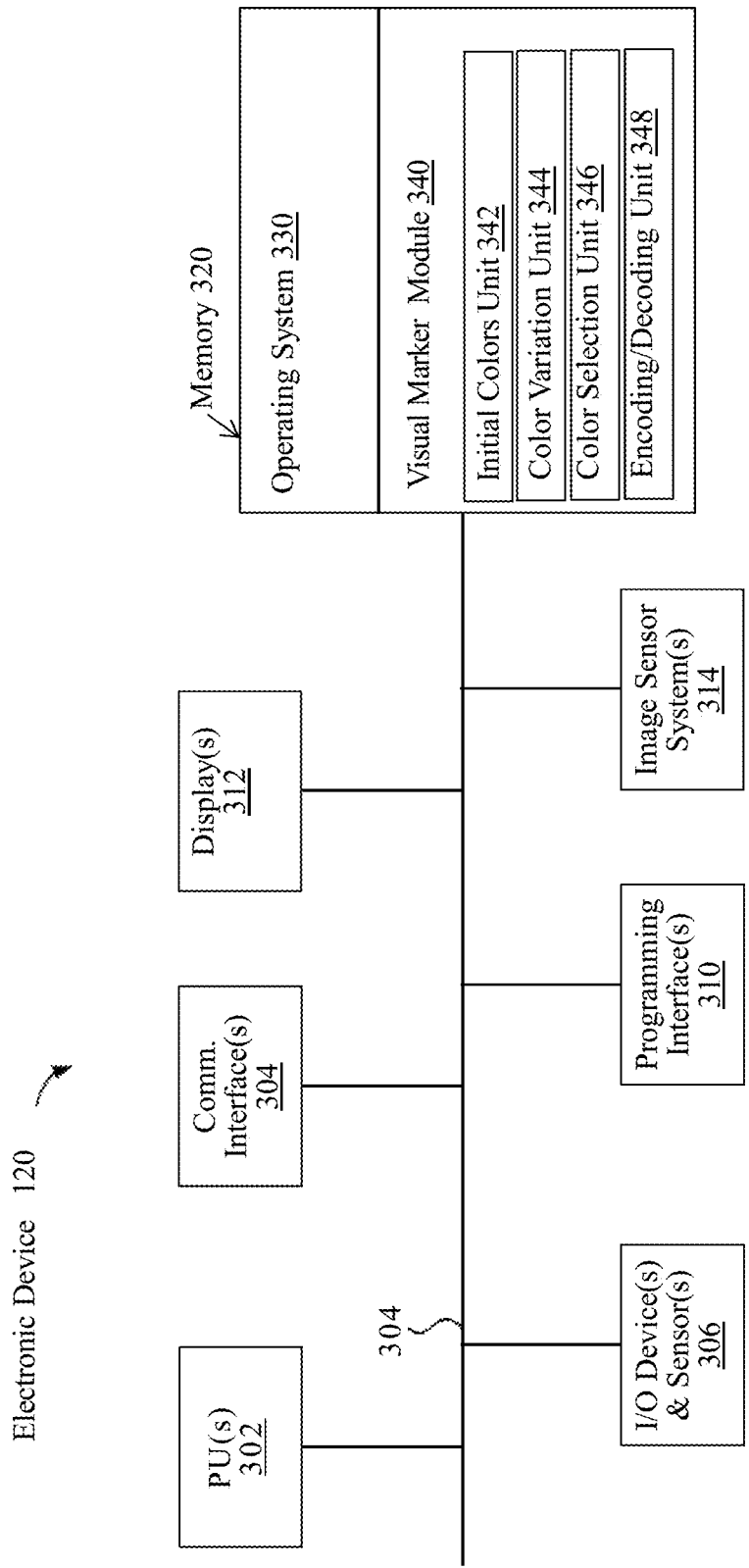
FIG. 3 is a block diagram of an example electronic device in accordance with some implementations.

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects or variants do not include all of the specific details described herein. Moreover, well-known systems, methods, components, devices and circuits have not been described in exhaustive detail so as not to obscure more pertinent aspects of the example implementations described herein. While FIGS. 1-3 depict exemplary implementations involving a hand-held mobile electronic device, other implementations may involve other types of devices including, but not limited to, watches and other wearable electronic devices, mobile devices, laptops, desktops, gaming devices, head mounted devices (HMDs), home automation devices, and other devices that include or use image capture devices.

FIG. 1 is a block diagram of an example operating environment 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100 includes a controller 110 and an electronic device 120, one or both of which may be in a physical environment. A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In some implementations, the controller 110 is configured to create, detect, or use visual markers or to manage and coordinate a computer-generated reality (CGR) environment for the user. In some implementations, the controller 110 includes a suitable combination of software, firmware, or hardware. The controller 110 is described in greater detail below with respect to FIG. 2. In some implementations, the controller 110 is a computing device that is local or remote relative to the physical environment 105.

In one example, the controller 110 is a local server located within the physical environment 105. In another example, the controller 110 is a remote server located outside of the physical environment 105 (e.g., a cloud server, central server, etc.). In some implementations, the controller 110 is communicatively coupled with the electronic device 120 via one or more wired or wireless communication channels 144 (e.g., BLUETOOTH, IEEE 802.11x, IEEE 802.16x, IEEE 802.3x, etc.).

In some implementations, the controller 110 and the electronic device 120 are configured to create, detect, or use visual markers or to present the CGR environment to the user together.

In some implementations, the electronic device 120 is configured to create, detect, or use visual markers or to present the CGR environment to the user. In some implementations, the electronic device 120 includes a suitable combination of software, firmware, or hardware. The electronic device 120 is described in greater detail below with respect to FIG. 3. In some implementations, the functionalities of the controller 110 are provided by or combined with the electronic device 120, for example, in the case of an electronic device that functions as a stand-alone unit.

According to some implementations, the electronic device 120 presents a CGR environment to the user while the user is present within the physical environment 105. A CGR environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality. A virtual reality (VR) environment refers to a simulated environment that is designed to be based entirely on computer-generated sensory inputs for one or more senses. A VR environment comprises virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality. An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

FIG. 2 is a block diagram of an example of the controller 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the controller 110 includes one or more processing units 202 (e.g., microprocessors, application-specific integrated-circuits (ASICs), field-programmable gate arrays (FPGAs), graphics processing units (GPUs), central processing units (CPUs), processing cores, or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, or the like type interface), one or more programming (e.g., I/O) interfaces 210, a memory 220, and one or more communication buses 204 for interconnecting these and various other components.

In some implementations, the one or more communication buses 204 include circuitry that interconnects and controls communications between system components. In some implementations, the one or more I/O devices 206 include at least one of a keyboard, a mouse, a touchpad, a joystick, one or more microphones, one or more speakers, one or more image capture devices or other sensors, one or more displays, or the like.

The memory 220 includes high-speed random-access memory, such as dynamic random-access memory (DRAM), static random-access memory (SRAM), double-data-rate random-access memory (DDR RAM), or other random-access solid-state memory devices. In some implementations, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some implementations, the memory 220 or the non-transitory computer readable storage medium of the memory 220 stores the following programs, modules and data structures, or a subset thereof including an optional operating system 230 and a visual marker module 240.

The operating system 230 includes procedures for handling various basic system services and for performing hardware dependent tasks.

In some implementations, the visual marker module 240 is configured to identify, share, or manage visual marker information. In some implementations, the visual marker module 240 includes an initial colors unit 242, a color variation unit 244, a color selection unit 246, and an encoding/decoding unit 248. The initial colors unit 242 is configured to identify or receive an initial set of colors selectable for use in a colored visual marker. The color variation unit 244 is configured to address variances in the set of selectable colors based on lighting conditions, printing conditions, or image sensor conditions. The color selection unit 246 is configured to select a subset of the set of selectable colors for use in a visual marker based on measures of color distance between the subset of colors. The encoding/decoding unit 248 is configured to encode/decode colored markings encoding data for the visual marker.

The visual marker module 240 may be used to create visual markers that are used, for example, by a CGR application that is configured to present virtual content (e.g., 3D content) that will be used as part of CGR environments for one or more users. For example, the user may view and otherwise experience a CGR-based user interface that allows the user to select, place, move, and otherwise experience a CGR environment based at least in part on detection and use of a visual marker, for example, via hand gestures, voice commands, input device inputs, etc.

Although these modules and units are shown as residing on a single device (e.g., the controller 110), it should be understood that in other implementations, any combination of these modules and units may be located in separate computing devices. Moreover, FIG. 2 is intended more as functional description of the various features which are present in a particular implementation as opposed to a structural schematic of the implementations described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, or firmware chosen for a particular implementation.

FIG. 3 is a block diagram of an example of the electronic device 120 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the electronic device 120 includes one or more processing units 302 (e.g., microprocessors, ASICs, FPGAs, GPUs, CPUs, processing cores, or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, or the like type interface), one or more programming (e.g., I/O) interfaces 310, one or more displays 312, one or more interior or exterior facing image sensor systems 314, a memory 320, and one or more communication buses 304 for interconnecting these and various other components.

In some implementations, the one or more communication buses 304 include circuitry that interconnects and controls communications between system components. In some implementations, the one or more I/O devices and sensors 306 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), or the like.

In some implementations, the one or more displays 312 are configured to present a CGR environment to the user. In some implementations, the one or more displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), or the like display types. In some implementations, the one or more displays 312 correspond to diffractive, reflective, polarized, holographic, etc. waveguide displays. For example, the electronic device 120 includes a single display. In another example, the electronic device 120 includes a display for each eye of the user.

In some implementations, the one or more interior or exterior facing sensor systems 314 include an image capture device or array that captures image data or an audio capture device or array (e.g., microphone) that captures audio data. In some implementations, the one or more image sensor systems 314 are configured to obtain image data that corresponds to at least a portion of the face of the user that includes the eyes of the user. For example, the one or more image sensor systems 314 include one or more RGB cameras (e.g., with a complimentary metal-oxide-semiconductor (CMOS) image sensor or a charge-coupled device (CCD) image sensor), monochrome camera, IR camera, event-based camera, or the like. In various implementations, the one or more image sensor systems 314 further include illumination sources that emit light (e.g., upon a subject or a portion of the face of the user) such as a flash or a glint source.

The memory 320 includes high-speed random-access memory, such as DRAM, SRAM, DDR RAM, or other random-access solid-state memory devices. In some implementations, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some implementations, the memory 320 or the non-transitory computer readable storage medium of the memory 320 stores the following programs, modules and data structures, or a subset thereof including an optional operating system 330 and a visual marker module 340.

The operating system 330 includes procedures for handling various basic system services and for performing hardware dependent tasks.

In some implementations, the visual marker module 340 is configured to identify, share, or manage visual marker information. In some implementations, the visual marker module 340 includes an initial colors unit 342, a color variation unit 344, a color selection unit 346, and an encoding/decoding unit 348. The initial colors unit 342 is configured to identify or receive an initial set of colors selectable for use in a colored visual marker. The color variation unit 344 is configured to address variances in the set of selectable colors based on lighting conditions, printing conditions, or image sensor conditions. The color selection unit 346 is configured to select a subset of the set of selectable colors for use in a visual marker based on measures of color distance between the subset of colors. The encoding/decoding unit 348 is configured to encode/decode colored markings encoding data for the visual marker.

The visual marker module 340 may be used to create visual markers that are used, for example, by a CGR application that is configured to present virtual content (e.g., 3D content) that will be used as part of CGR environments for one or more users. For example, the user may view and otherwise experience a CGR-based user interface that allows the user to select, place, move, and otherwise experience a CGR environment based at least in part on detection and use of a visual marker, for example, via hand gestures, voice commands, input device inputs, etc.

Moreover, FIG. 3 is intended more as a functional description of the various features which are present in a particular implementation as opposed to a structural schematic of the implementations described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, or firmware chosen for a particular implementation.

Various implementations disclosed herein include devices, systems, and methods that determine multiple colors (e.g., 2-8) for a visual marker that encodes data using colored markings. In some implementations, the determined multiple colors for the visual marker remain detectable to electronic devices despite wide variations in lighting conditions or printing/display conditions (e.g., where the visual marker is deployed).

In various implementations, visual markers are 2D objects that encode binary data such as strings (e.g., QR codes) or other payloads used to access remotely-based experiences (e.g., remotely-based experiences). In some implementations, the links to the remotely-based experiences include links to initiate payments (e.g., sanctioned payment endpoints), links to websites (e.g., URLs), or links that launch into web-based experiences. In some implementations, the visual markers are used to launch only into or link only to sanctioned remotely-based experiences authorized by the creator of the visual marker. In some implementations, the creator of the visual markers includes an entity that designs the visual marker, an entity that prints (e.g., makes) the visual marker (e.g., developer), as well as an entity that manages/hosts the visual markers.

Figure 4:
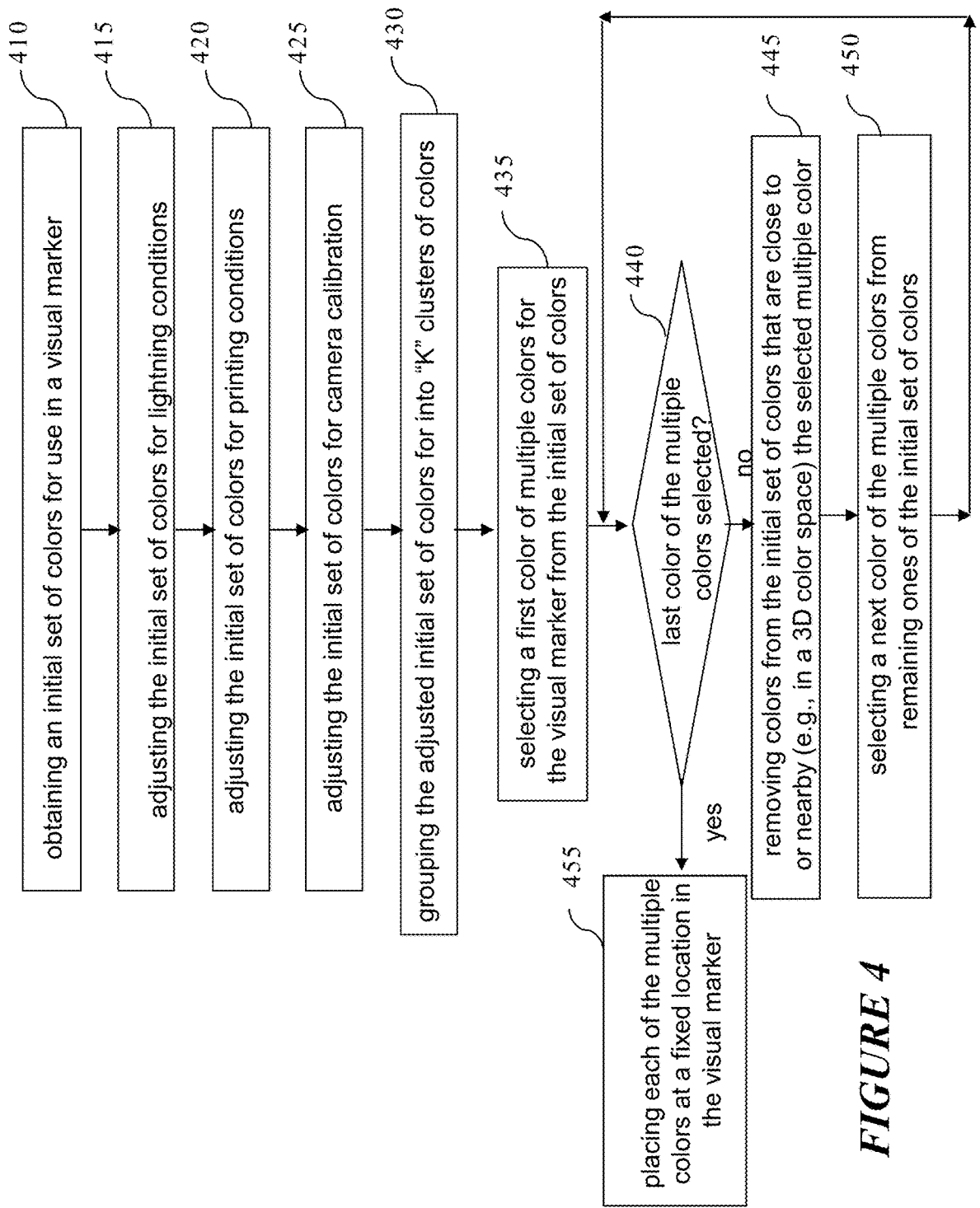
FIG. 4 is a flowchart illustrating an exemplary method of determining multiple colors for a visual marker for variations in lighting conditions, printing/display conditions, or image sensor calibration in accordance with some implementations.

FIG. 4 is a flowchart illustrating an exemplary method 400 of determining multiple colors for a visual marker that addresses variations in lighting conditions, printing/display conditions, or image sensor calibration in accordance with some implementations. In some implementations, the method 400 is performed by a device (e.g., controller 100 or electronic device 120 of FIGS. 1-3). The method 400 can be performed using an electronic device or by multiple devices in communication with one another. In some implementations, the method 400 is performed by processing logic, including hardware, firmware, software, or a combination thereof. In some implementations, the method 400 is performed by a processor executing code stored in a non-transitory computer-readable medium (e.g., a memory).

At block 410, the method 400 obtains an initial set of colors for use in a visual marker. In some implementations, the initial set of colors can be an arbitrary number of colors (e.g., 30, 80, 150). In some implementations, the arbitrary number of colors in the initial set of colors is based on a computational budget. In some implementations, the initial set of colors can be based on an initial input image. In some implementations, the initial set of colors can be any set of colors. In some implementations, the initial set of colors is randomly generated. In some implementations, the initial set of colors are selected by a visual marker designer. In some implementations, the initial set of colors are selected based on colors at a location in a physical environment. In some implementations, the initial set of colors are selected based on an input image. In some implementations, the initial set of colors can be based on an initial input image by extracting colors in the initial input image and grouping or selecting from the extracted colors to reduce a number of colors from the initial input image until the arbitrary number for the initial set of colors is reached. For example, this may involve identifying the top N colors in the image, e.g., the 10 colors with the most number of pixels. In one implementation, a 3D color space representing colors from the initial input image can be discretized into the arbitrary number.

At block 415, the method 400 determines effects of lighting conditions on the initial set of colors in the visual marker once the initial set of colors is determined. In some implementations, the initial set of colors is called palette0. In some implementations, a plurality of instances of palette0 under various lighting conditions are generated as paletteI, where I equals one, two, ..., N; where N is a positive integer greater than 2. In some implementations, the plurality of paletteI are determined synthetically using chromatic adaptation algorithms. In some implementations, the plurality of paletteI are determined using actual images of palette0 obtained under a variety of real-world lighting conditions.

Figure 5:
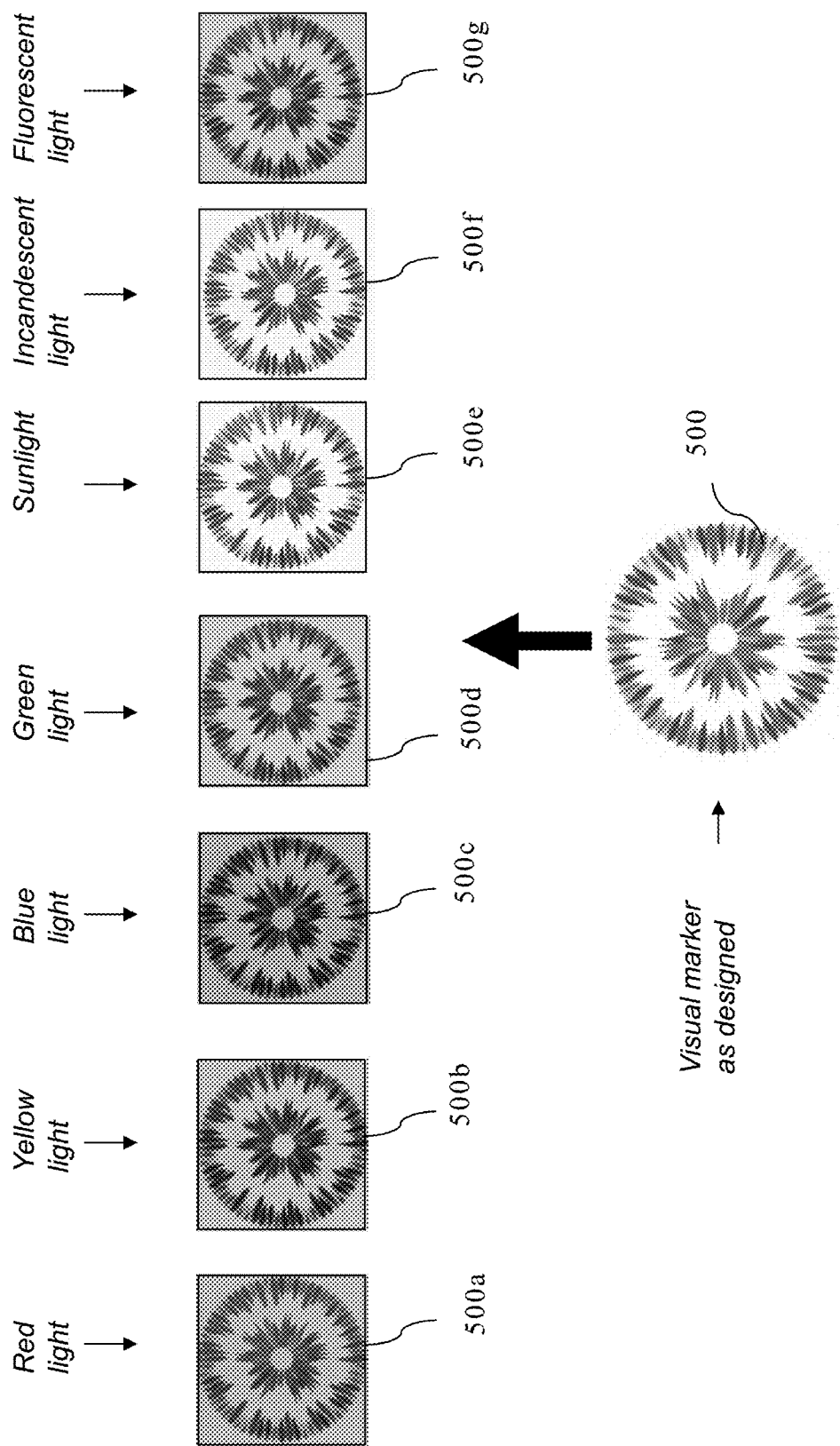
FIG. 5 is a diagram illustrating various lighting condition effects on multiple colors for a visual marker in accordance with some implementations.

FIG. 5 is a diagram illustrating various lighting condition effects on a visual marker in accordance with some implementations. As shown in FIG. 5, a visual marker 500 that uses 4 selected colors to encode data has its appearance affected by lighting conditions (e.g., where the visual marker 500 will be deployed). As shown in FIG. 5, effects 500a, 500b, ..., 500g of various light sources are generated by computer modeling. In some implementations, all potential lighting conditions are known because potential illumination sources that exist in the world are known (e.g., the sun and its spectrum, light bulbs, LED light sources, incandescent lights, fluorescent lights, etc.). In some implementations, a single lighting condition for a deployed visual marker is known because, for example, the visual marker designer knows the visual marker will be deployed in a museum with a single fixed interior illumination condition.

Figure 6:
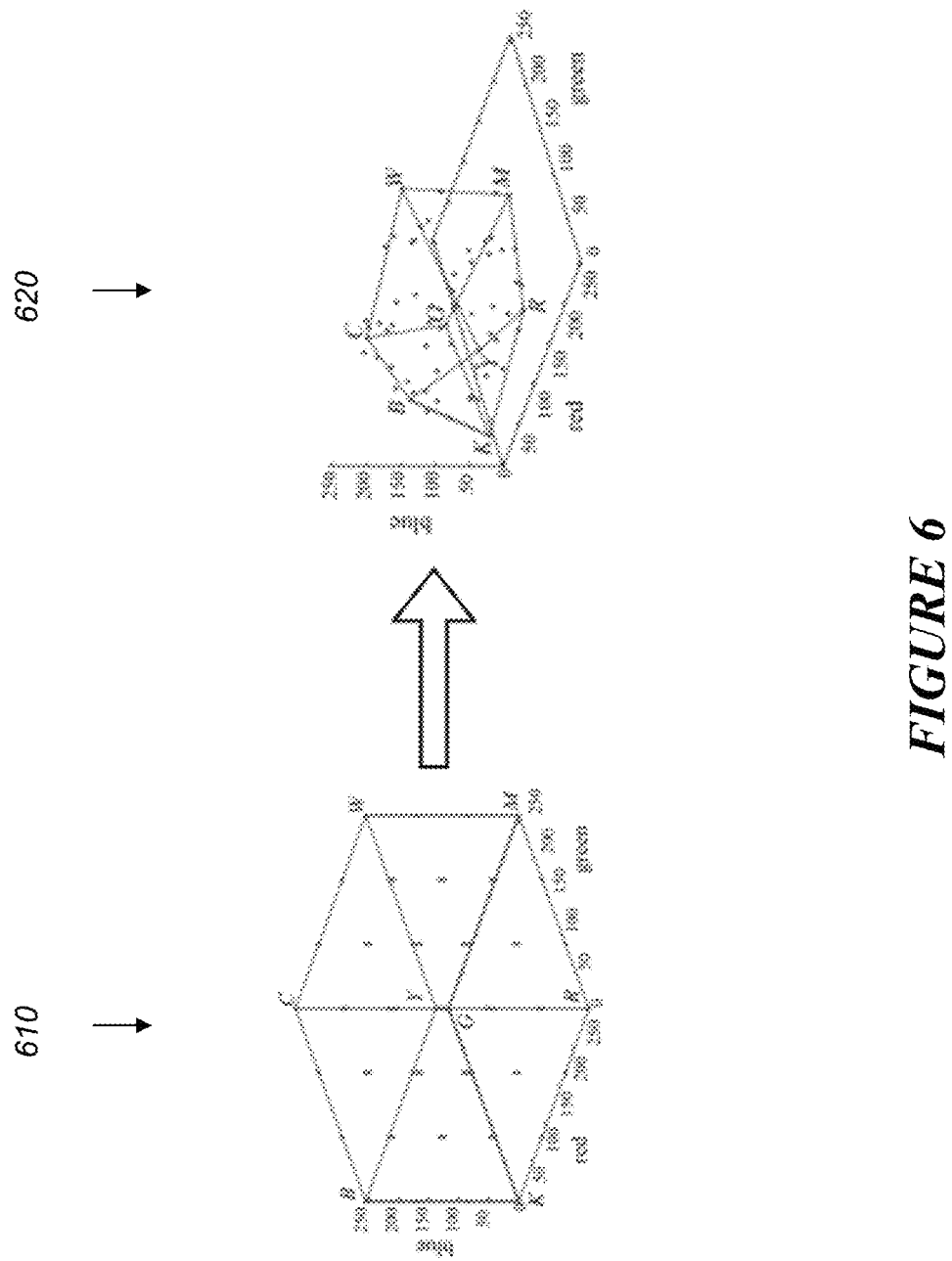
FIG. 6 is a diagram illustrating various printing condition effects on multiple colors for a visual marker in accordance with some implementations.

At block 420, the method 400 determines effects of printing the initial set of colors once the initial set of colors is determined. FIG. 6 is a diagram illustrating exemplary printing condition effects on a visual marker in accordance with some implementations. As shown in FIG. 6, an exemplary RGB color space 610 (e.g., shown as a cube) is translated to an exemplary printed color space 620. As shown in FIG. 6, printing conditions have effects on the exemplary RGB color space 610. As shown in FIG. 6, the printing conditions squeeze various colors from the RGB color space 610 by different amounts in generating the modified printed color space 620.

For example, in some implementations, a printer combines four colors of ink (e.g., CMYK) to generate a printed output of an input. In another example, in some implementations, a printer combines 3 colors of ink (e.g., RGB) to generate a printed output of an input.

In some implementations, the type of printer is known, the model of the printer is known, and even an amount of printing supplies (e.g., CYMK ink levels) is known (e.g., by a user or the visual marker developer). In some implementations, as more information about the printing conditions is known, the modified printer color space 620 becomes larger or more accurate.

At block 425, the method 400 determines effects of an image sensor or camera on the initial set of colors of the visual marker once the initial set of colors is determined. In some implementations at block 425, the method adjusts the initial set of colors for the image sensor calibration or the camera calibration. In various implementations, 2 different colors in a physical environment of the real world may not be detected as those same exact 2 colors by the image sensor or camera. In some implementations, image sensor or camera calibration accounts for a translation from real world colors to colors sensed (e.g., seen) by a particular camera model, a particular camera maker, or a particular type of camera.

Figure 7:
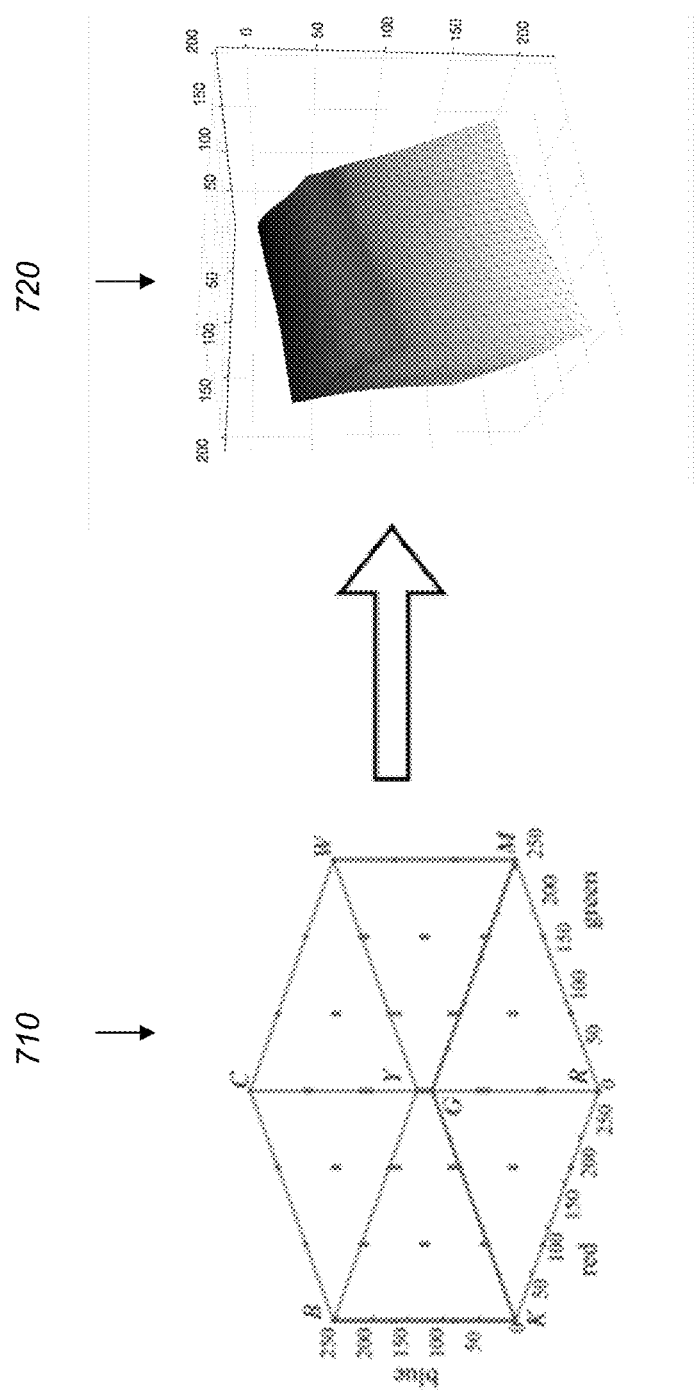
FIG. 7 is a diagram illustrating various image sensor calibration effects on multiple colors for a visual marker in accordance with some implementations.

FIG. 7 is a diagram illustrating exemplary camera calibration effects on a visual marker in accordance with some implementations. As shown in FIG. 7, an exemplary RGB color space 710 (e.g., shown as a cube) is translated to an exemplary modified sensor calibration color space 720 based on a camera calibration. As shown in FIG. 7, the exemplary camera calibration has effects on the exemplary RGB color space 710. As shown in FIG. 7, the camera calibration modifies various colors from the RGB color space 670 by different amounts in generating the modified sensor calibration color space 720.

In some implementations, a type of image sensor is known, a model of the image sensor is known, and even one or more possible calibrations for a family of image sensors is known (e.g., by the visual marker developer). In some implementations, as more information about the image sensor calibration is known or provided (e.g., more accurate calibration), the modified sensor calibration color space 720 becomes larger or more accurate.

In some implementations at block 425, the method 400 uses information about a printer from block 420 that will be used to print this visual marker to map the palette0 and the paletteI from a first 3D color space (e.g., RGB 3D color space) to a second 3D color space (e.g., CMYK 3D color space). In some implementations at block 425, the method 400 uses information about printer conditions or a printing device from block 420 that will be used to print this visual marker to map at least a subset of the palette0 and the paletteI from a first 3D color space (e.g., RGB 3D color space) to a second 3D color space (e.g., CMYK 3D color space) to address effects of lighting and printing conditions on the initial set of colors.

In some implementations at block 425, the method 400 uses the information about the image sensor or the camera calibration from block 425 that will be used to detect the visual marker to map the colors from the initial set of colors modified by lighting and printing conditions in the second 3D color space to a third 3D color space (e.g., an RGB 3D color space of the image sensor) to address effects of the image sensor calibration on the initial set of colors.

At block 430, the method 400 groups the adjusted initial set of colors in the third 3D color space (e.g., an image sensor RGB 3D color space) into "K" clusters of colors where K is a positive integer (e.g., 30, 50, 100, etc.). In some implementations, the grouping in block 430 uses known clustering techniques. In some implementations, the grouping in block 430 uses known nearest neighbor techniques or other known techniques to group the adjusted initial set of colors in the third 3D color space in block 430.

FIG. 8 is a diagram illustrating exemplary clusters resulting from grouping points in the third 3D color space that result from adjusting the initial set of colors for lighting conditions, printing conditions, or image sensor calibration in accordance with some implementations. As shown in FIG. 8, an input image 810 is used to obtain an initial set of colors 820 that include 24 colors to represent the input image 810. As shown in FIG. 8, the initial set of colors 820 result in an adjusted initial set of colors 840 in a camera RGB 3D color space 830. As shown in FIG. 8, the adjusted colors 840 result from the initial set of colors 820 modified for printing conditions, lighting conditions, or camera calibration. As shown in FIG. 8, exemplary clusters 840*a*, 840*b* includes a subset of the adjusted colors 840 that result from one or more of the initial set of colors 820. In some implementations, the "K" clusters of the adjusted colors 840 each include a plurality of the initial set of colors 820. In some implementations, a number of the "K" clusters of the adjusted colors 840 is greater than a number of the initial set of colors 820.

In blocks 435-450, the method 400 selects multiple colors (e.g., 2-8) to be used on the visual marker (e.g., from the initial set of colors obtained in block 410). In some implementations, the multiple colors are automatically, semi-automatically, or manually selected from the initial set of colors. In some implementations, once a first color of the multiple colors is selected (e.g., automatically, semi-automatically, or manually), remaining colors of the multiple colors are automatically selected from the initial set of colors. In some implementations, the remaining colors of the multiple colors are semi-automatically or manually selected from the initial set of colors. In some implementations, the multiple colors for the visual marker are selected to remain detectable and distinguishable from one another despite wide variations in lighting conditions, printing/display conditions, or detecting devices (e.g., image sensors).

At block 435, the method 400 selects a first color of the multiple colors for the visual marker from the initial set of colors obtained in block 410. In some implementations, the first multiple color is randomly selected from the initial set of colors obtained in block 410. In some implementations, the first multiple color is selected from the initial set of colors obtained in block 410 based on the initial input image used to obtain the initial set of colors (e.g., the dominant color of the initial input image). In some implementations, the first multiple color is selected by a user from the initial set of colors obtained in block 410.

In some implementations at block 435, the initial set of colors are presented or displayed in an ordered sequence to a user. In some implementations, the initial set of colors are ordered in accordance with a color spectrum such as the visible spectrum (e.g., red to blue). In some implementations, the initial set of colors are ordered based on which of the K clusters has the most number of points so that a subset of the initial set of colors contained in the largest of the K clusters are first in the ordered sequence. In some implementations, the initial set of colors are ordered randomly.

At block 440, the method 400 determines whether the last of the multiple colors has been selected (e.g., a fourth color of 4 multiple colors for use in the visual marker is selected). When the determination in block 440 is negative, the method 400 continues to block 445.

At block 445, the method 400 removes or eliminates colors in 3D color space from the initial set of colors that are close to the most recently selected color of the multiple colors. In some implementations, the nearest neighboring clusters to the cluster containing the most recently selected color of the multiple colors are eliminated along with any of the initial set of colors contained therein, which causes nearby colors of the initial set of colors to be removed or eliminated from some future selections (in block 450). In some implementations, clusters within a threshold spatial distance in the third 3D color space from the cluster containing the most recently selected color of the multiple colors are eliminated at block 445.

At block 450, the method 400 selects the next color of the multiple colors from remaining ones of the initial set of colors. At block 450, the next color of the multiple colors can be selected from the remaining ones of the initial set of colors as described above in block 435. From block 450, the method returns to block 440.

Figure 9:
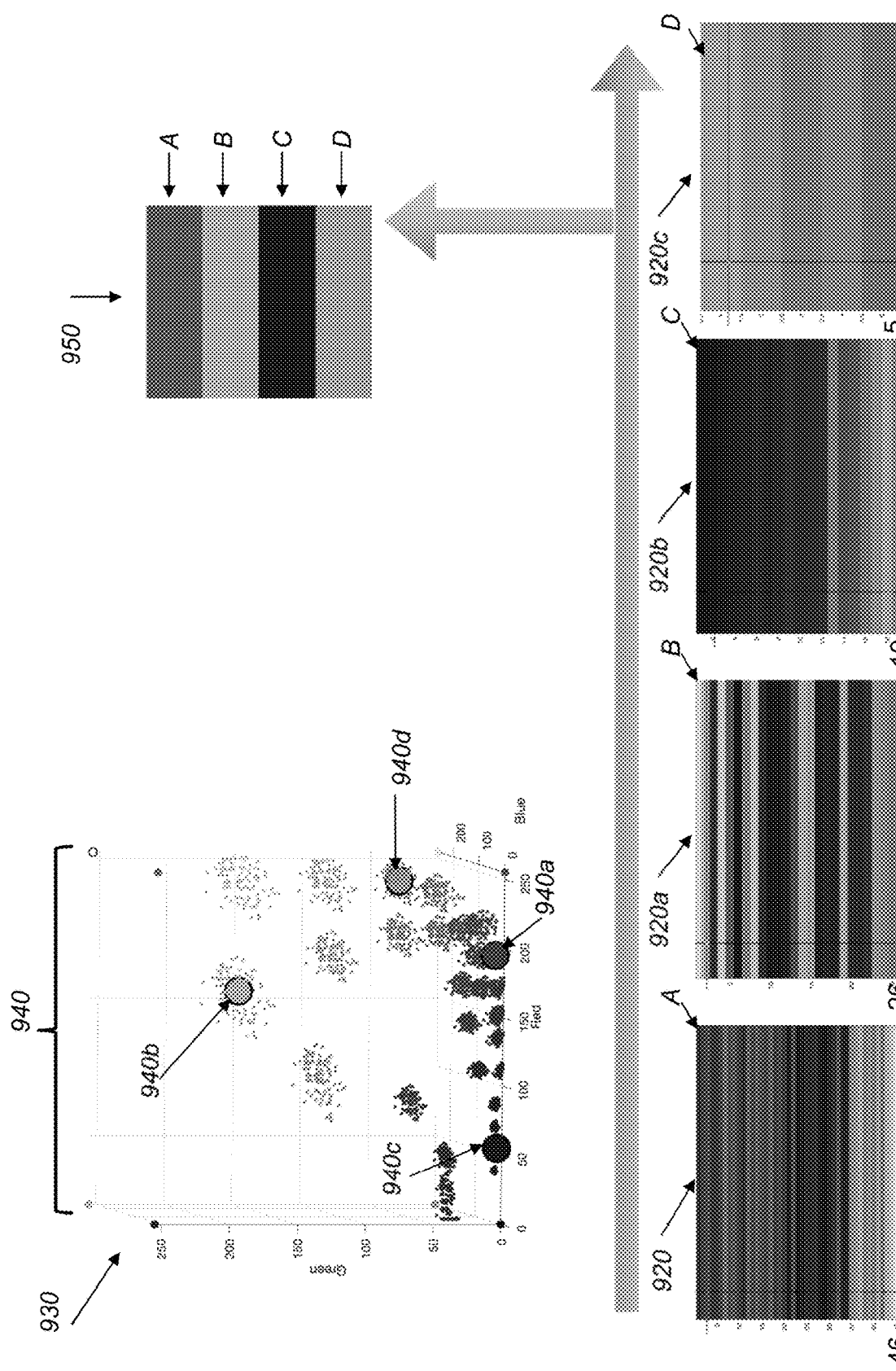
FIG. 9 is a diagram illustrating exemplary selection of multiple colors for a visual marker resulting from an initial set of colors in accordance with some implementations.

FIG. 9 is a diagram illustrating exemplary selection of multiple colors for use in encoding colored markings in a visual marker from an initial set of colors in accordance with some implementations. As shown in FIG. 9, four colors A, B, C, D are selected as multiple colors 950 for a visual marker from an initial set of 46 colors 920.

As shown in FIG. 9, A, B, C, D can be selected as the multiple colors 950 for the visual marker automatically based on a size and spatial arrangement of clusters 940*a*, 940*b*, . . . , 940*n* containing an adjusted initial set of colors 940 in a camera RGB 3D color space 930. In some implementations, after a first color is selected from the initial set of colors 920, the remaining colors of the multiple colors 950 are selected automatically based on a total spatial distance between the colors of the multiple colors 950 (e.g., A, B, C, D) represented by clusters in the RGB 3D color space 930.

Alternatively, as shown in FIG. 9, the initial set of 46 colors 920 could be presented in an ordered sequence to a user. In this implementation, the user selects a first color (A) of the multiple colors 950 from the ordered initial set of colors 920. Then in some implementations, colors that are spatially close to the color A based on a 3D color space are removed from the initial set of colors 920, which results in remaining colors 920*a* of the initial set of colors. In one implementation, clusters in the adjusted initial set of colors 940 in a camera RGB 3D color space 930 that are close to the cluster containing the first color A are eliminated.

Then in this implementation, the 26 remaining ones 920*a* of the initial set of colors 920 are presented in the ordered sequence to the user. In some implementations, the remaining ones 920*a* of the initial set of colors 920 are presented so that the best to worst choices of the remaining colors are listed first to last in the ordered sequence. As shown in FIG. 9, the user selects a second color (B) of the multiple colors 950 from the ordered remaining colors 920*a*. Then in some implementations, colors that are spatially close to the color B based on a 3D color space are removed from the remaining ones 920*a* of the initial set of colors 920, which results in remaining colors 920*b* of the initial set of colors.

Then in this implementation, the 19 remaining ones 920*b* of the initial set of colors 920 are presented in the ordered sequence to the user. In some implementations, the remaining ones 920*b* of the initial set of colors 920 are presented so that the best to worst choices of the remaining colors are listed first to last in the ordered sequence. As shown in FIG. 9, the user selects a third color (C) of the multiple colors 950 from the ordered remaining colors 920*b*. Then in some implementations, colors that are spatially close to the color C based on a 3D color space are removed from the remaining ones 920*b* of the initial set of colors 920, which results in remaining colors 920*c* of the initial set of colors.

Then in this implementation, the 5 remaining ones 920*c* of the initial set of colors 920 are presented in the ordered sequence to the user. In some implementations, the remaining ones 920*c* of the initial set of colors 920 are presented so that the best to worst choices of the remaining colors are listed first to last in the ordered sequence. As shown in FIG. 9, the user selects a fourth color (D) of the multiple colors 950 from the ordered remaining colors 920*c*, and selection of the multiple colors 950 is complete. As shown in FIG. 9, a top color of the ordered set of initial colors 920, 920*a*, 920*b*, 920*c* is selected for the multiple colors 950, however, any color contained in each of the ordered set of initial colors 920, 920a, 920b, 920c is selectable at that time.

Returning to the method 400, when the determination in block 440 is affirmative, the method 400 continues to block 455. At block 455, the method 400 places each of the multiple colors at a fixed location at the visual marker.

Figure 10:
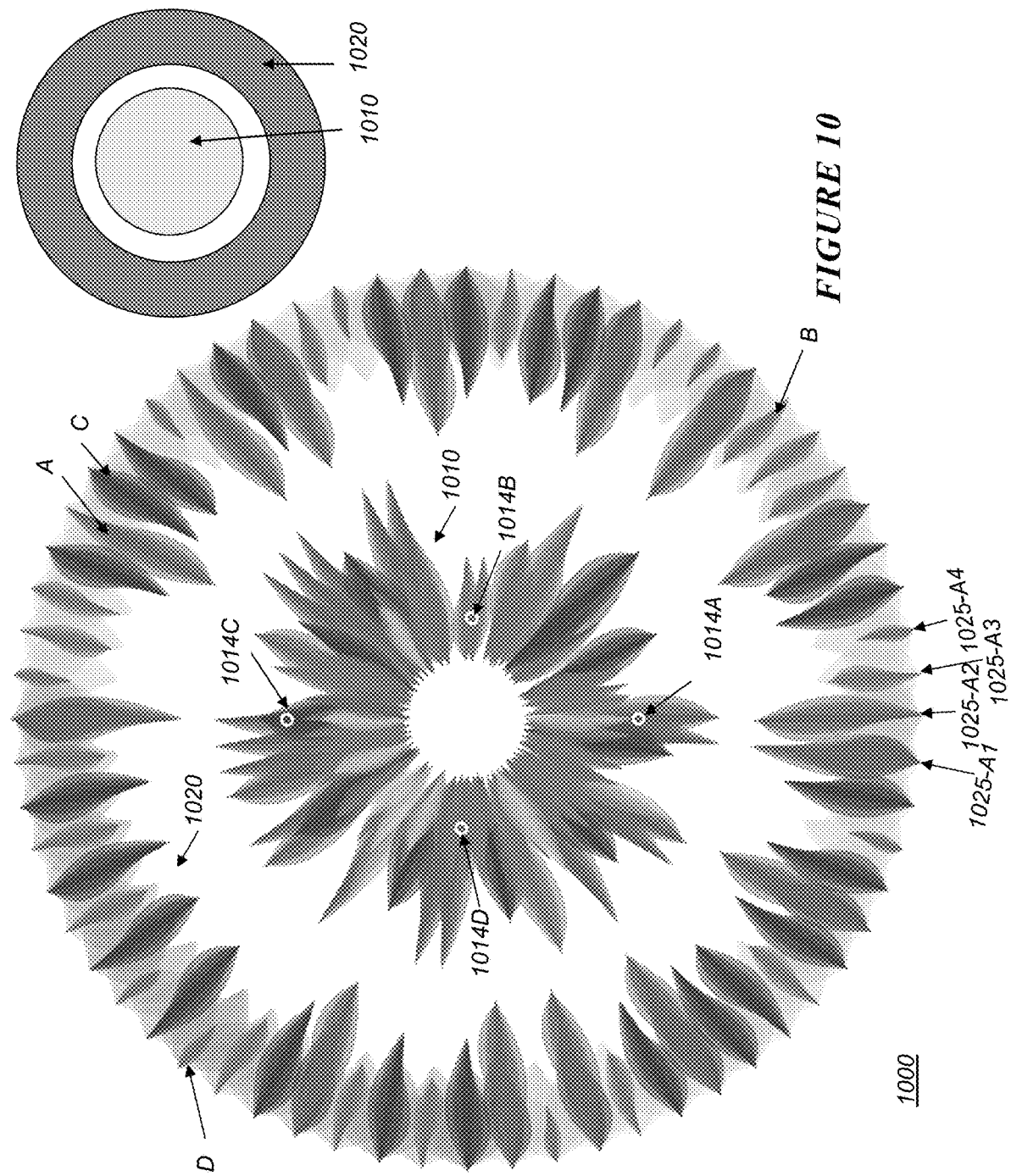
FIG. 10 is a diagram illustrating an exemplary colored visual marker in accordance with some implementations.

FIG. 10 is a diagram illustrating an exemplary colored visual marker in accordance with some implementations. As shown in FIG. 10, a visual marker 1000 includes a first portion 1010 for detection and orientation, a second portion 1014A-D to identify colors used in the visual marker 1000, which are the multiple colors in the method 400 (e.g., 950), and a third portion 1020 to encode data in the visual marker 1000 using color.

As shown in FIG. 10, the first portion 1010 includes a preset shape for detection and orientation. In some implementations, the first portion 1010 is an inner area having a predefined shape that is consistent for multiple different visual markers, e.g., visual markers that encode different data using different colors. As shown in FIG. 10, the first portion 1010 is an inner ring having a specific overall predefined shape.

In some implementations, the second portion 1014A-D includes known locations or positions in the first portion 1010 or the specific overall shape of the visual marker 1000 that are each colored with one of the multiple colors (e.g., 950) used in the visual marker 1000. As shown in FIG. 10, the second portion 1014 includes 4 locations 1014A, 1014B, 1014C, and 1014D in the first portion 1010 that are each respectively colored with one of the A, B, C, or D colors used in the visual marker 1000. In other implementations, second portion 1014 can include a different number of locations corresponding to each of the colors selected for the visual marker. As shown in FIG. 10, the second portion 1014 includes elements that make up the first portion 1010. In other implementations, the first and second portions are distinct and separate.

In some implementations, the third portion 1020 encodes the data of the visual marker 1000 using color. As shown in FIG. 10, the third portion 1020 encodes the data of the visual marker 1000 using shape and color. In some implementations, the third portion 1020 is an outer area of colored shapes. In FIG. 10, the third portion 1020 includes colored shapes 1025-A1, 1025-A2, . . . sequentially ordered clockwise or counterclockwise from a starting position. As shown in FIG. 10, the third portion 1020 includes colored shapes 1025 that include combinations of 5 sizes, 2 shapes, 4 colors, and 2 orientations (e.g., tapering radially inward or tapering radially outward).

In some implementations, an additional portion of the visual marker 1000 may be colored using a single color (e.g., white or grey). In some implementations, the additional portion of the visual marker 1000 may be colored using a single color that is not used in the first portion 1010 or the third portion 1020. In some implementations, the additional portion of the visual marker 1000 is at least one of a central region of the visual marker 1000, a region of the visual marker 1000 between the first portion 1010 and the third portion 1020, or a region (e.g., a ring) outside the third portion 1020. In some implementations, the additional portion of the visual marker 1000 is at least one of a region of the visual marker 1000 adjacent at least a part of the first portion 1010 or adjacent at least a part of the third portion 1020. In some implementations, the additional portion of the visual marker 1000 is used to perform local white balancing of colors in the visual marker 1000 upon detection by an image sensor. In some implementations, the additional portion of the visual marker 1000 is used to detect spatially varying illumination at the detected visual marker or correct for any detected spatially varying illumination. For example, when there is a shadow detected in the additional region that is both a central region of the visual marker 1000 and a region outside the third portion 1020 (e.g., across part of the visual marker 1000), the detected shadow in the additional region can be used to correct for the color changes the visual marker 1000 (e.g., first portion 1010, third portion 1020) caused by the shadow. In some implementations, the spatially varying illumination at a detected visual marker is caused by a light source, uneven lighting, objects in the physical environment, or the like.

In various implementations, the visual markers 1000 are 2D or 3D objects that encode binary data such as strings (e.g., QR codes) or other payloads used to access remotely-based experiences. In some implementations, the links to the remotely-based experiences include links to initiate payments (e.g., sanctioned payment endpoints), links to websites (e.g., URLs), or links that launch into web-based experiences.

In some implementations, the image the visual markers 1000 are detected in images of the physical environment is obtained using a sensor (e.g., camera) on the electronic device. In some implementations, the sensor is a combination of sensors such as a RGB camera, stereo cameras, a depth sensor (e.g., time of flight, structured light), a RGB-D camera, one or more 2D cameras, IR cameras, or the like.

In some implementations, the electronic device can determine a relative positioning between the electronic device and the visual marker 1000 detected in the one or more images of the physical environment including the visual marker 1000. In some implementations, the relative positioning determines the relative orientation of the visual marker 1000 with respect to the electronic device. In some implementations, the relative positioning is determined using computer vision techniques (e.g., VIO or SLAM) or PNP techniques.

In some implementations as shown in FIGS. 9-10, at block 455, the method 400 places the colors A, B, C, D of the multiple colors 950 at the 4 locations 1014A, 1014B, 1014C, and 1014D of second portion 1014 of the visual marker 1000.

In some implementations once the multiple colors are chosen, alternate sets of color choices (e.g., alternative multiple colors) for the visual marker can be presented to the designer that also will be detectable to electronic devices despite wide variations in lighting conditions or printing/display conditions. In some implementations, alternative colors in each cluster containing one of the multiple colors can be used as alternate colors (e.g., A', B', C', D') for the multiple colors to encode the same data as the original multiple colors, which allows the designer freedom to choose among an increased number of colors without compromising the lighting or print invariant decoding of the deployed visual marker. In some implementations, the alternate sets of color choices (e.g., alternative multiple colors) for the visual marker are combinations of colors from the initial set of colors that are respectively included in each of the K clusters containing the multiple colors selected for the visual marker. For example, when 100 colors, which are numbered 1-100, are in the initial set of colors, and color 10 (in cluster W), color 30 (in cluster X), color 60 (in cluster Y), color 90 (in cluster Z) are the multiple colors. In this example, cluster W also contains colors 12 and 14, cluster X also contains colors 22, 29 and 32, cluster Y contains colors 62, 64, and cluster Z also contains color 2. In this example, the alternate sets of color choices (e.g., alternative multiple colors) for the visual marker are combinations of 4 colors where 1 color is selected from each of cluster W, cluster X, cluster Y, and cluster Z.

In some implementations, when obtaining the initial set of colors (e.g., block 410), the designer of the visual marker can add at least one color that is not originally provided in the initial set of colors (e.g., in palette0). Then, any colors added to the initial set of colors would be considered or optimized as well in selecting the multiple colors (e.g., the remaining portions of the method 400). In some implementations, the designer of the visual marker can add a color that is not originally provided in the initial set of colors when the multiple colors resulting from the initial set of colors do not have a sufficient spatial separation in a 3D color space. In some implementations, the designer of the visual marker can add at least one color that is not originally provided in the initial set of colors using techniques of color harmony or the science of color harmony. In some implementations, the designer of the visual marker can automatically, semi-automatically, or manually add at least one color that is not originally provided in the initial set of colors using the techniques or the science of color harmony. Color harmony provides a recipe to generate or choose new colors that harmonize naturally with the existing palette. For example, a gold yellow harmonizes with royal blue. In some implementations, color harmony may be used to automatically, semi-automatically, or manually select the multiple colors or alternate sets of color choices from outside the initial set of colors.

In some implementations, before selecting the multiple colors (e.g., automatically or manually) from the initial set of colors (e.g., blocks 435-450), the designer of the visual marker may remove shades of white and black from the initial set of colors. In some implementations, removing shades of white and black from selection will obtain greater variety in the multiple colors because white and black are generally selected based on their respective locations in a 3D color space.

In some implementations, the actual lighting conditions where the visual marker will be deployed are known. In such implementations, additional flexibility or accuracy is provided in selecting the multiple colors for use in the colored visual marker. For example, consider a visual marker will be displayed on a poster illuminated in blue LED light. In this example, should red, green and blue be used to encode data on the visual marker, that data will be seen by an electronic device as black, black, and blue, and the visual marker will not be readable. In this example when the known actual lighting conditions are a blue LED, the multiple colors should be shades of blue or otherwise detectable when illuminated by the blue LED.

In some implementations, electronic devices that take an input image (e.g., used to obtain the initial set of colors) where a visual marker is to be deployed includes an ambient light sensor. In some implementations, data from the ambient light sensor is includes in information about the lighting conditions used to determine multiple colors for a colored visual marker.

Various implementations disclosed herein include graphic user interfaces (GUIs) for devices, systems, and methods that determine multiple colors for a visual marker that encodes data using colored markings as described herein. In some implementations, GUIs provide capabilities for the user to obtain an initial set of colors through manual selection, random generation, based on a received color input, based on a color input image or the like. In some implementations, GUIs provide capabilities for the user to add colors to or remove colors from the initial set of colors. In some implementations, GUIs provide capabilities for the user to accept default lighting conditions, or to identify, select, or modify among a set of lighting conditions. In some implementations, GUIs provide capabilities for the user to accept default printing conditions, or to identify, select, or modify among a set of printing conditions. In some implementations, GUIs provide capabilities for the user to accept default image sensor calibrations, or to identify, select, or modify among a set of image sensor calibrations. In some implementations, GUIs provide capabilities for the user to prioritize among (e.g., weight) lighting conditions, printing conditions, or image sensor calibrations when generating the multiple colors for use in colored visual markers. In some implementations, GUIs provide capabilities for the user to select one or more among lighting conditions, printing conditions, or image sensor calibrations when generating the multiple colors for use in colored visual markers. In some implementations, GUIs provide capabilities for the user to manually, semi-automatically (e.g., recommended colors), or automatically select the multiple colors from the initial set of colors. In some implementations, GUIs provide capabilities for the user to review a detectability strength or measure of the multiple colors relative to a standard scale or to a deployed environment (e.g., digital or physical) including recommendation to add additional colors (e.g., or recommended colors to add) to achieve a threshold value for the detectability measure. In some implementations, GUIs provide capabilities for the user to be presented with, generate, or make modifications to potential alternative sets of multiple colors. In some implementations, GUIs provide capabilities for the user to encode data into a visual marker using the multiple colors and parameterized colored shapes.

Figure 11:
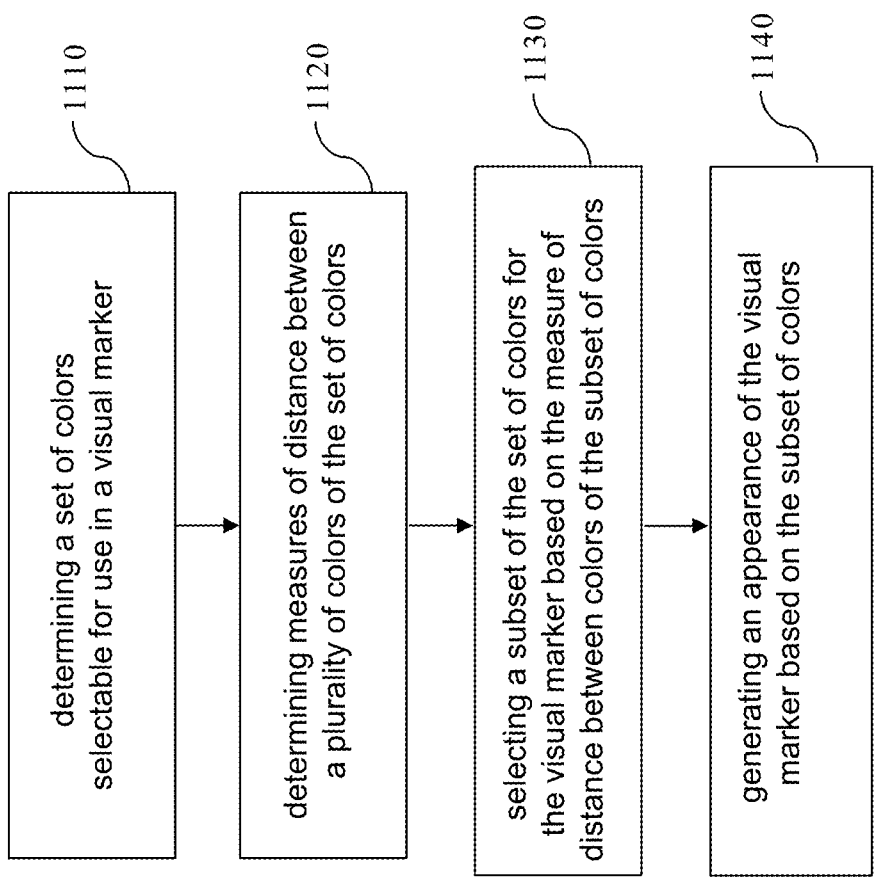
FIG. 11 is a flowchart illustrating an exemplary method of determining a set of colors for a visual marker that encode data using color in accordance with some implementations.

FIG. 11 is a flowchart illustrating an exemplary method 1100 of determining a set of colors for a visual marker that encode data using color in accordance with some implementations. In some implementations, the set of colors for the visual marker address variations in lighting conditions or printing/display conditions. In some implementations, the method 1100 is performed by a device (e.g., controller 100 or electronic device 120 of FIGS. 1-3). The method 1100 can be performed using an electronic device or by multiple devices in communication with one another. In some implementations, the method 1100 is performed by processing logic, including hardware, firmware, software, or a combination thereof. In some implementations, the method 1100 is performed by a processor executing code stored in a non-transitory computer-readable medium (e.g., a memory).

In some implementations, the method 1100 obtains an initial set of colors (e.g., 100), for example based on an input image of a deployed visual marker location, and the set of colors (e.g., 4) for the visual marker are automatically determined (or the user is guided to select) based on relative positions of the multiple colors in a color space. In some implementations, the determined set of colors may be the most invariant or sufficiently invariant to changes in lighting conditions or printing/display conditions based on exceeding a spatial distance separation threshold in a 3D color space.

At block 1110, the method 1100 determines a set of colors selectable for use in a visual marker. In some implementations, the set of selectable colors is an arbitrary number of colors. In some implementations, the set of colors numbers 30, 40, or 80. In some implementations, a number of the set of colors numbers is based on a computational budget or time. In some implementations, the set of colors is based on a physical location where the visual marker is to be deployed. In some implementations, the set of colors is based on colors in an input color image. For example, the input image may include 1 million colors that can be reduced to 100 colors as the set of colors that still represent the input color image. In some implementations, when the input color image includes only shades of blue, then the set of colors may include only blue colors.

At block 1120, the method 1100 determines measures of distance between a plurality of colors of the set of colors. In some implementations, a measure of distance between all the colors of the set of colors is determined. In some implementations, the measures of distance are based on a spatial position of the plurality of colors of the set of colors in a 3D color space such as an RGB 3D color space, an XYZ 3D color space, a CYMK 3D color space, or the like. In some implementations, the measures of distance are based on a position of the plurality of colors of the set of colors along a color spectrum. For example, the measure of distance can determine that one blue color differs from a first green color by 10 units and that the blue color differs from a second green color by 12 units.

At block 1130, the method 1100 selects a subset of the set of colors for the visual marker based on the measure of distance between colors of the subset of colors. In some implementations, the subset of colors are selected so that there is an increased or maximum separation among the subset of colors in a 3D color space. In some implementations, the subset of colors are selected so that there is threshold separation between pairs of the subset of colors in a 3D color space. In some implementations, the subset of colors are selected because the subset of colors are sufficiently distinguishable or differentiated independent of lighting conditions, printing/displaying conditions, or devices detecting (e.g., image sensors or color cameras) the visual marker. In some implementations, the subset of colors are selected because the subset of colors are the most invariant or sufficiently invariant to changes in lighting conditions, printing/displaying conditions, or detecting devices (e.g., image sensors or color cameras). In some implementations, black and white are restricted from the subset of colors. In the example from block 1120, the blue color and the second green color are selected because the second green color is more different from the blue color than the first green color.

At block 1140, the method 1100 generates an appearance of the visual marker based on the subset of colors. In some implementations, the visual marker appearance includes placing each of the subset of colors at a preset fixed location on the visual marker. In some implementations, the visual marker appearance includes graphical elements encoding data using the subset of colors. In some implementations, the graphical elements also encode the data of the visual marker using shape or size.

For example, in one colored visual marker 10 color markings encode data using 2 colors (e.g., the colored markings have the same shape and size). The series of colored markings in the visual marker is T1, P1, T, T2, P3, P2, P5, T3, P, P4 where T represents a tan colored marking and P represents a pink colored marking. Then, the data encoded in the visual marker can be 0100111011.

In some implementations at block 1120, variations of the set of colors are identified based on information about a lighting condition where the visual marker is to be deployed, a printing device condition of a printer that will print the visual marker, a display device condition of a device that will display the deployed visual marker, or a detecting device (e.g., imaging sensor) that will detect the deployed visual marker. In some implementations, variations of the set of colors are identified based on information about multiple lighting conditions, multiple printing device conditions, multiple display device conditions, or multiple detecting device conditions. In some implementations, the measures of distance take into account the identified variations of the set of colors based on lighting conditions, printing conditions, display conditions, or detecting (e.g., imaging) conditions.

In some implementations, an image of the physical environment that includes the visual marker at a deployed location is obtained using a sensor (e.g., image sensor, camera) on a mobile electronic device having a processor. In some implementations, the image is a 2D image or a 3D image. In some implementations, combinations of image sensors are used. In some implementations, color images can be used. Alternatively, in some implementations, grayscale images can be used. In some implementations, images of the physical environment are used to generate a CGR environment representing the physical environment. In some implementations, the CGR environment is generated using VIO or SLAM position tracking or the like at the mobile electronic device.

Figure 12:
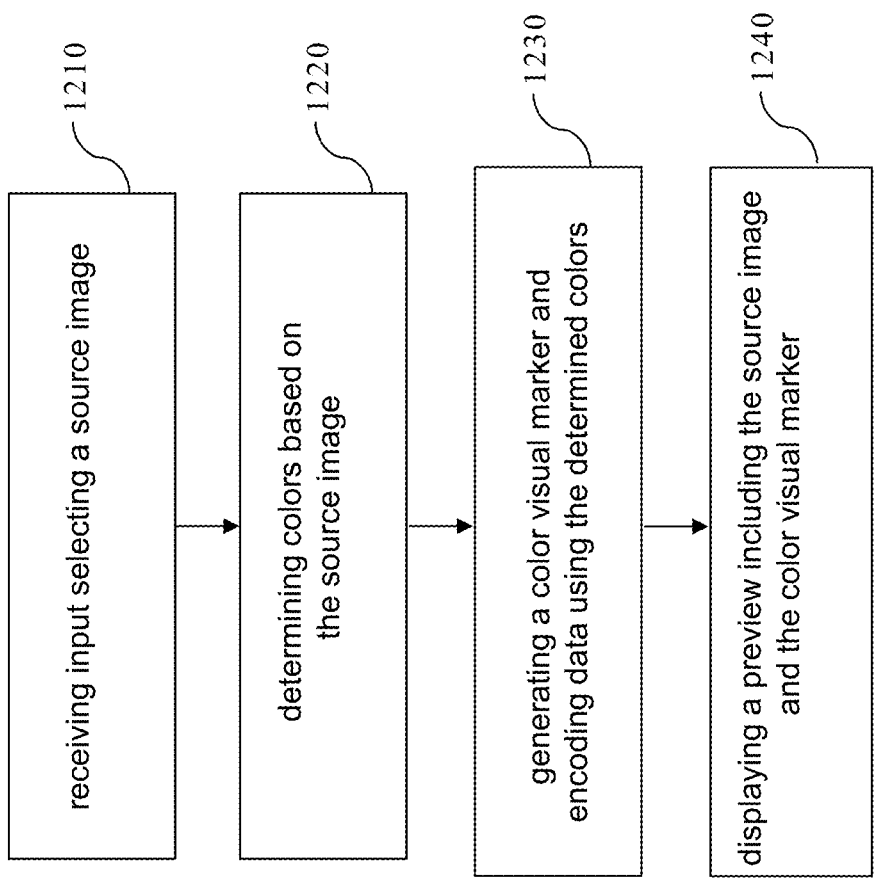
FIG. 12 is a flowchart illustrating an exemplary method of determining multiple colors based on a source image for visual markers that encode data using color in accordance with some implementations.

FIG. 12 is a flowchart illustrating an exemplary method 1200 of determining multiple colors based on a source image for visual markers that encode data using color (e.g., size, shape, color, or orientation of graphical elements) in accordance with some implementations. In some implementations, a user selects a type of visual marker template, and position and size on a background or the source image. In some implementations, the user previews the colored visual marker. In some implementations, the user previews the colored visual marker overlapping the source image. In some implementations, the method 1200 is performed by a device (e.g., controller 100 or electronic device 120 of FIGS. 1-3). The method 1200 can be performed using an electronic device or by multiple devices in communication with one another. In some implementations, the method 1200 is performed by processing logic, including hardware, firmware, software, or a combination thereof. In some implementations, the method 1200 is performed by a processor executing code stored in a non-transitory computer-readable medium (e.g., a memory).

At block 1210, the method 1200 receives input selecting a source image. In some implementations, the input to select the source image is received at a display. In some implementations, the input to select the source image is received using a GUI at the display. In some implementations, the source image is selected from locally stored images. In some implementations, the source image is imported from remotely stored images.

At block 1220, the method 1200 determines multiple colors based on the source image. In some implementations, the multiple colors are automatically selected from the source image. In some implementations, the multiple colors are semi-automatically selected based on the source image. In some implementations, input to select a first color of the multiple colors based on the source image is received using the GUI. In some implementations, user input to select all of the multiple colors based on the source image is received using the GUI. In some implementations, user input into color pickers are used to select the multiple colors. In some implementations, user input to select a first color of the multiple colors based on the source image is received using the GUI, and remaining colors of the multiple colors are automatically selected. In some implementations, the multiple colors are a preset number (e.g., 2-8). In some implementations, the multiple colors may be determined based on detectability. In some implementations, detectability of the multiple colors is based on one or more of separation in a 3D color space, lighting conditions, printing conditions, displaying conditions, image capture sensors, or aesthetic information. In some implementations, user input selects the multiple colors, of which one or more may be automatically modified based on detectability.

At block 1230, the method 1200 generates a colored visual marker and encodes data using the determined multiple colors. In some implementations, user input to select a type of visual marker template (e.g., triangular, rectangular, hexagonal, 2-color, 3-color, 4-color, etc.) for the colored visual marker is received using the GUI. In some implementations, user input selects layouts or styling options for the visual marker. In some implementations, the visual markers are 2D codes using colored markings (e.g., size, shape, color, or orientation of graphical elements) to encode data. In some implementations, user input to select the data to be encoded in the colored visual marker is received using the GUI.

At block 1240, the method 1200 displays a preview including the source image and the colored visual marker. In some implementations, the preview may be overlapped with respect to the source image. In some implementations, user input to select a position or a size on the source image or a background is received using the GUI. In some implementations, user input to store, copy, preview, or transmit the generated colored visual marker is received using the GUI. In some implementations, the preview includes part or all of a viewable display. In some implementations, the source image is used as all or part of a background for the colored visual marker.

Figure 13:
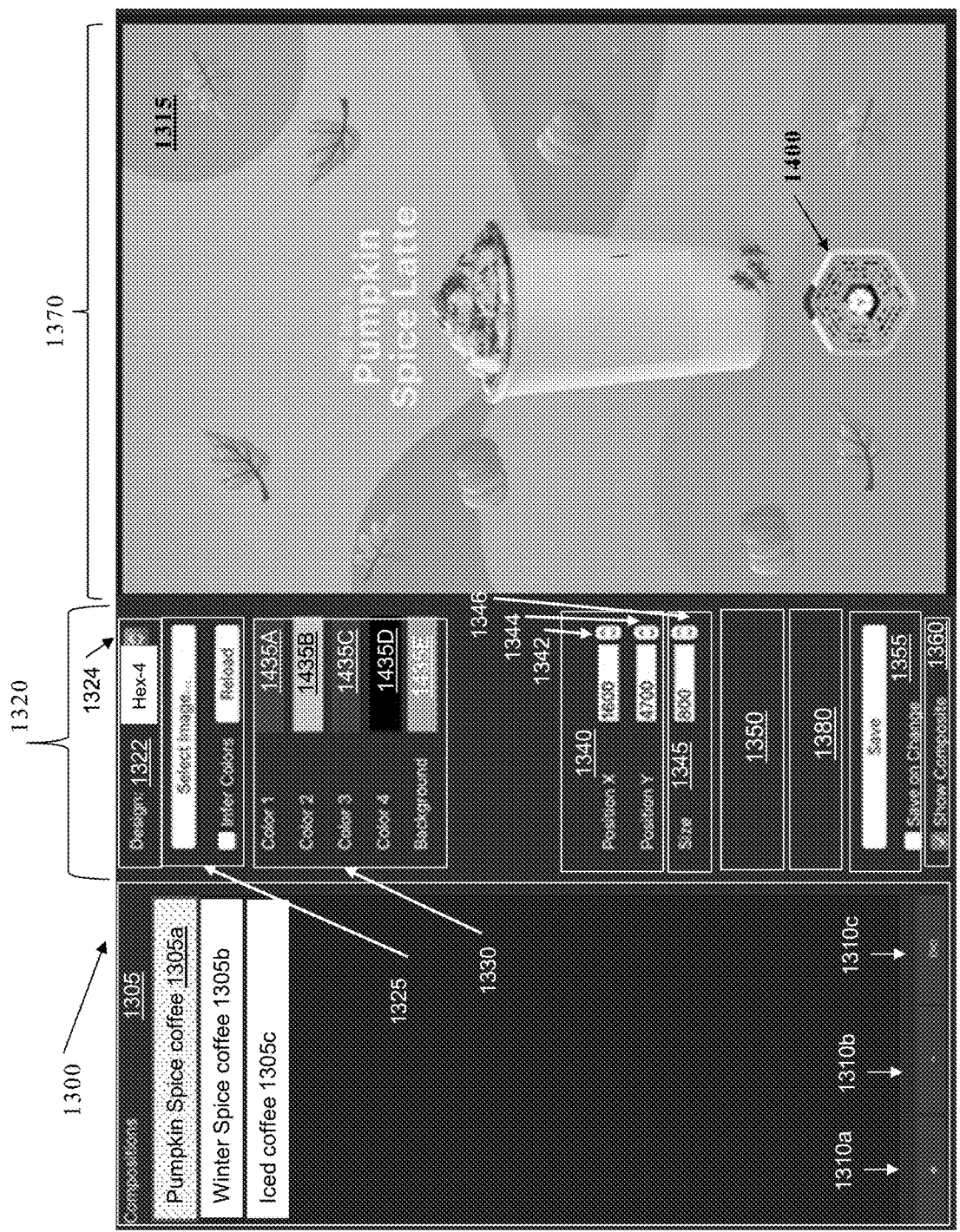
FIG. 13 is a diagram illustrating an exemplary user interface to design visual markers that encode data using color in accordance with some implementations.

FIG. 13 is a diagram illustrating an exemplary UI to design visual markers that encode data using color in accordance with some implementations. As shown in FIG. 13, a UI 1300 includes features that allow input to be received from a designer to design or display already designed colored visual markers. In some implementations, the UI 1300 is available or stored as a system service using an operating system of an electronic device.

In some implementations, the UI 1300 includes a compositions section 1305 that allows input to be received from the designer for entry of a new colored visual marker, or access to already designed and stored colored visual markers. As shown in FIG. 13, a selected composition 1305*a* is being designed, and compositions 1305*b* and 1305*c* are already created and stored (e.g., locally). In some implementations, the compositions 1305*b* and 1305*c* are stored locally in the designer's documents folder. In some implementations, a composite of the visual marker is designed or stored that may include one or more of a visual marker, an input image, additional parameters entered by the designer such as the multiple colors used to encode data in the visual marker, and a composite of the input image and the colored visual marker. In some implementations, the compositions section 1305 includes a selection 1310*a* (e.g., +) to initiate a new visual marker in the compositions section 1305, a selection 1310*b* (e.g., −) to remove a visual marker from the compositions section 1305, and a selection 1310*c* (e.g., co) to copy a selected visual marker in the compositions section 1305 as a new visual marker (e.g., with default parameters of the copied visual marker as a starting point).

Figure 14:
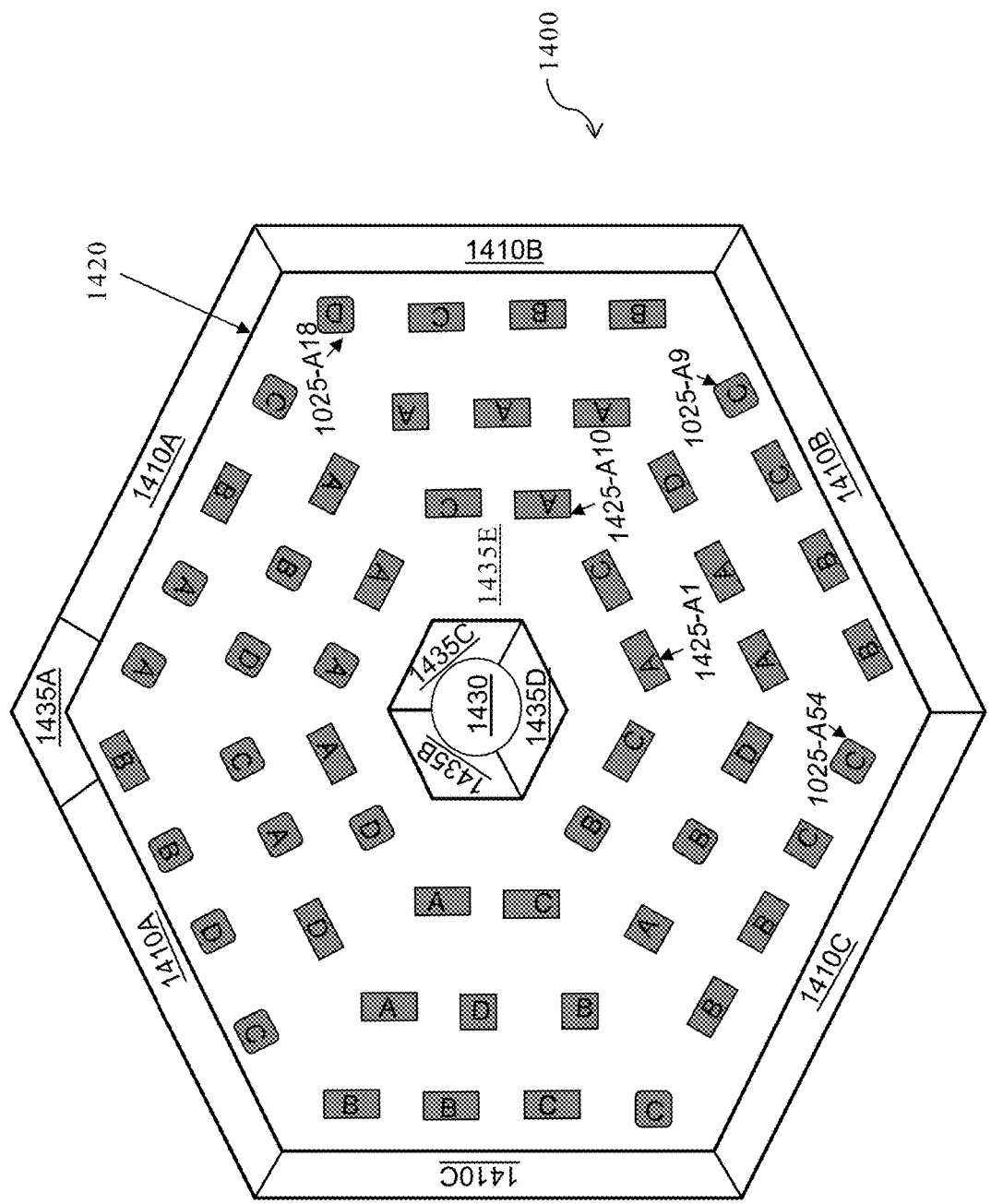
FIG. 14 is a diagram illustrating an exemplary colored visual marker in accordance with some implementations.

As shown in FIG. 13, the selected composition 1305*a* includes visual marker 1400 and input image 1315 displayed in a viewer 1370. FIG. 14 is a diagram that shows the example visual marker 1400.

In some implementations, a parameters portion 1320 allows input to be received from the designer to select among various parameters of a colored visual marker. In some implementations, changes made in the parameters portion 1320 are shown (e.g., live update) in the viewer 1370.

In some implementations, a design portion 1322 allows input to be received from a designer to choose among visual marker types. In some implementations, visual marker types correspond to preset amounts of encoded data such as 32 bytes, 128 bytes, 512 bytes, etc. In some implementations, visual marker types correspond to types based on light conditions such as monochrome, low light, sunlight for color, display, fluorescent, etc. In some implementations, the visual marker type correspond to a prescribed number of colors (e.g., 2-8 for encoding data in colored markings). In some implementations, combinations of visual marker types are selectable. As shown in FIG. 13, the visual marker type "Hex-4" is selectable from a pull-down list of available visual marker types.

As shown in FIG. 13, the visual marker 1400 includes a hexagonal shape, 4 colors (1435A, 1435B, 1435C, 1435D) to encode data in colored markings, and a separate (e.g., aesthetic) background color (1435E).

In some implementations, a select image section 1325 allows input to be received from a designer to choose an image to be used to design the visual marker or composition. In some implementations, the images selectable by the select image section 1325 are locally stored, stored in a prescribed location, or remotely accessible. In some implementations, images are selected by the select image section 1325 using a browse dialog window function. In some implementations, an infer colors button in the select image section 1325 initiates automatic generation of the colors 1435A-1435E based on the input image. In some implementations, the infer colors button is an on-off toggle switch. In some implementations, a reload button in the select image section 1325 reloads the selected current image from select image section 1315 and resets the colors 1435A-1435E to their original settings.

In some implementations, the encoding colors section 1330 allows input to be received from a designer to automatically or semi automatically select the multiple colors 1435A, 1435B, 1435C, 1435D used to encode data in colored markings on the visual marker 1400. In some implementations, the encoding colors section 1330 includes a background color 1435E, which is selected (e.g., manually, automatically) to ensure the multiple colors 1435A, 1435B, 1435C, 1435D remain distinguishable from one another, and therefore detectable, in different conditions (e.g., lighting conditions, printing conditions, displaying conditions, image sensor characteristics, or combination thereof).

In some implementations, the colors 1435A-1435E are automatically selected based on the input image 1315 (e.g., the infer colors button in the select image section 1325 is selected). In some implementations, the designer manually changes a selected color of the colors 1435A-1435E by selection of a new color. For example, the designer changes the first color 1435A, (e.g., using a 3D color space dialogue window). In this example, colors 1435B-1435E are automatically modified to ensure their detectability (e.g., see FIG. 9 or block 1130). In some implementations, both hue of the multiple colors 1435A-1435E and luminescence of the multiple colors 1435A-1435E are evaluated to ensure detectability.

In some implementations, the designer manually changes the color of one of more of the colors 1435A-1435E by dragging the selected color such as 1435A over the input image 1315 and the selected color 1435A changes to match the underlying color at that location (e.g., pixel) of the input image 1315. In this example, upon selection of a new color for the color 1435A, colors 1435B-1435E are automatically modified to ensure their detectability (e.g., see FIG. 9 or block 1130). In some implementations, the designer selects new colors for one or more of the colors 1435A-1435E using other color selection techniques. In some implementations, the colors 1435A-1435E selected by the designer are evaluated (e.g., for aesthetic or detectability characteristics) and proposed modified colors presented in the UI 1300 to the designer may be accepted with a single action by the designer.

In some implementations, the designer switches a color of the visual marker 1400 (e.g., the first color 1435A) with another color of the visual marker 1400 (e.g., the third color 1435C), and the visual marker is re-encoded accordingly. For example, the designer drags the color 1435C over the color 1435A until the colors switch in the encoding colors section 1330. In some implementations, any of the multiple colors in the visual marker being designed (e.g., visual marker 1400) may be changed as described in herein.

In some implementations, a position section 1340 allows input to be received from the designer to locate the visual marker in the viewer 1370 or over/on the input image. In some implementations, a position for the visual marker 1400 is input using an X position and a Y position, and the visual marker 1400 is moved to that position over the input image 1315. In some implementations, the entered X and Y positions for the visual marker 1400 may be increased or decreased using increase/decrease section buttons 1342, 1344, respectively. Alternatively, the designer can select the visual marker 1400 (e.g., using a touchscreen, a cursor, or the like) and drag the visual marker 1400 around the viewer 1370 or over the input image 1315 to position the visual marker 1400 with respect to the input image 1315. In some implementations, the visual marker may only be positioned so that the visual marker 1400 is completely visible in the viewer 1370 (e.g., cannot be partially off-screen).

In some implementation, a size section 1345 allows input to be received from the designer to enter a size for the visual marker in the viewer 1370 or over/on the input image. In some implementations, a size for the visual marker 1400 is manually input in the size section 1345, and the visual marker 1400 is changed to that size over the input image 1315. In some implementations, the entered size for the visual marker 1400 may be increased or decreased using increase/decrease section button 1346. Alternatively, in some implementations, the designer can select the visual marker 1400 (e.g., using a touchscreen, a cursor, or the like) and directly increase/decrease the size of the visual marker 1400 in the viewer 1370 or over the input image 1315. In some implementations, the visual marker may only be sized so that the visual marker 1400 is completely visible in the viewer 1370 (e.g., cannot be partially off-screen).

In some implementations, a data entry section 1350 allows input to be received from the designer to input the data to be encoded into the visual marker 1400 using the colored markings. In some implementations, the data entry section 1350 uses standard text, symbol, or graphical entry techniques.

In some implementations, a save section 1355 receives input to manually save, periodically save, or save on change, the composition currently being designed. In some implementations, the designer manually saves the composition currently being designed by selection of the "save" button in the save section 1355. In some implementations, the designer selects a resolution at which to save the visual marker or the composition currently being designed using the save section 1355. In some implementations, the composition currently being designed is saved on change using the "save on change" selection. In some implementations, the "save on change" selection is an on-off toggle switch.

In some implementations, a show composite section 1360 allows input to be received to alternate between displaying the visual marker 1400 or the composite, which includes the visual marker 1400 with the selected input image 1315 in the viewer section 1370.

In some implementations, a print section 1380 allows input to be received from the designer to print the visual marker 1400 or the composite, which includes the visual marker 1400 with the selected input image 1315 in the viewer section 1370. In some implementations, the designer selects a resolution at which to print the visual marker or the composition currently being designed using the print section 1380.

FIG. 14 is a diagram illustrating an exemplary colored visual marker in accordance with some implementations. As shown in FIG. 14, a visual marker 1400 includes a first portion 1410 for detection and orientation, a third portion 1420 to encode data in the visual marker 1400 using color markings, and a second portion 1435 including known locations (e.g., 4) in the specific overall shape of the visual marker 1400 that are each colored with one of the multiple colors (e.g., A, B, C, D) used in the encoded color markings of the third portion 1420 of the visual marker 1000.

As shown in FIG. 14, the first portion 1410 includes a preset shape for detection and orientation. In some implementations, the first portion 1410 is an outer area having a predefined shape that is consistent for multiple different visual markers, e.g., visual markers that encode different data using different colors. As shown in FIG. 14, the first portion 1410 is a thin hexagonal shape with a gap for orientation. In some implementations, additional portions of the visual marker 1400 may also be used for rectification or orientation. As shown in FIG. 14, the first portion 1410 includes three sections 1410A, 1410B, and 1410C. In some implementations, the three sections 1410A, 1410B, and 1410C are three shades of a single color. In some implementations, the three sections 1410A, 1410B, and 1410C are lighter grey, light grey, and grey, where grey is darker than light grey, and light grey is darker than lighter grey.

In some implementations, the second portion 1435A-D includes known locations or positions in the first portion 1410 or the specific overall shape of the visual marker 1400 that are each colored with one of the data encoding colors used in the visual marker 1400. As shown in FIG. 14, the second portion 1435 has 4 locations including a first location 1435A (e.g., in the first portion 1410), a second location 1435B, a third location 1435C, and a fourth location 1435D. The four locations 1435A-1435D are each respectively colored with one of the A, B, C, or D colors used encoding data in colored markings in the third portion 1420. In some implementations, the second portion 1435 can include a different number of locations corresponding to each of the colors selected for the visual marker. In some implementations, the four locations 1435A-1435D correspond to the multiple colors of block 455 of the method 400, the multiple colors 950 of FIG. 9, or the subset of colors of block 1130 of the method 1100.

In some implementations, the third portion 1420 encodes the data of the visual marker 1400 using color. As shown in FIG. 14, the third portion 1420 encodes the data of the visual marker 1400 using at least shape and color. In FIG. 14, the third portion 1420 is between the first portion 1410 and the 4 locations of the second portion 1435. As shown in FIG. 14, the third portion 1420 includes colored markings 1425 that include combinations of 2 shapes (e.g., square, rectangle) and the 4 colors of the second portion 1435. In some implementations, the third portion 1420 includes colored shapes 1425-A1, 1425-A2, . . . , 1425A54 sequentially ordered by quadrant clockwise or counterclockwise from a starting position. As shown in FIG. 14, the third portion 1420 further includes a background location 1435E that uses the color E that is different from colors used in the first portion 1410 and the second portion 1435. In some implementations, the color of the background location is selected for detectability of the colors of the second portion 1435.

In some implementations, the visual marker 1400 includes a central area 1430. In some implementations, the central area 1430 is used for decoration (e.g., a company logo). In some implementations, the central area 1430 includes specific shapes or color for detection, or specifically shaped, sized, or angled symbols for orientation or rectification of the visual marker 1400 (e.g., in a captured image of a physical environment). In some implementations, the second location 1435B, the third location 1435C, and the fourth location 1435D surround the central area 1430.

In some implementations, the single color of the three sections 1410A, 1410B, and 1410C is not used in the first portion 1410 or the third portion 1420. In some implementations, the three sections 1410A, 1410B, and 1410C are used to perform local white balancing of colors in the visual marker 1400 upon detection by an image sensor. In some implementations, the three sections 1410A, 1410B, and 1410C are used to detect spatially varying illumination at the detected visual marker 1400 or correct for any detected spatially varying illumination. In some implementations, the spatially varying illumination at a detected visual marker 1400 is caused by a light source, uneven lighting, objects in the physical environment, or the like.

Figure 15:
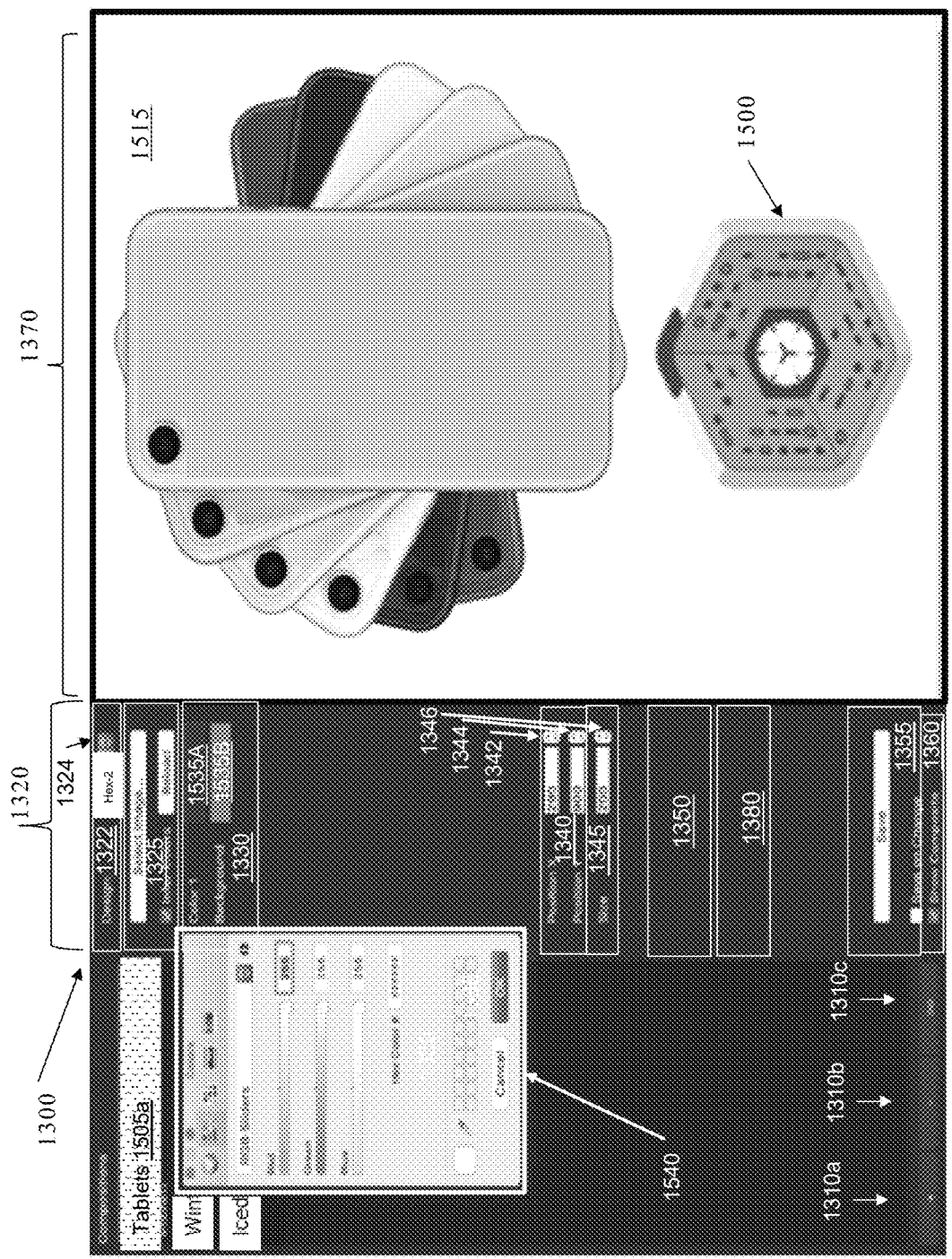
FIG. 15 is a diagram illustrating an exemplary user interface including color selection to design visual markers that encode data using color in accordance with some implementations.

FIG. 15 is a diagram illustrating the UI 1300 configured to design another visual marker that encodes data using color. In some implementations, the UI 1300 allows input to be received from the designer to determine multiple colors based on a source image for visual markers that encode data using color (e.g., size, shape, color, or orientation of graphical elements). As shown in FIG. 15, a selected composition 1505a includes parameters for visual marker 1500 that are determined with a source image 1515 using the UI 1300. As shown in FIG. 15, the visual marker 1500 includes a hexagonal shape, 1 color 1535A, two shapes being a rectangle or a square that are outlined or solid to encode data in colored markings, and a separate background color 1535B.

FIG. 15 is a diagram that shows an example dialog window 1540 of the encoding colors section 1330 that allows manual selection of a color (e.g., 1535A) of the multiple colors in a colored visual marker being designed. As shown in FIG. 15, the dialog window 1540 allows manipulation of a red color slider, a blue color slide and a green color slider to determine a newly selected color for a first color 1535A of a visual marker 1500.

In some implementations, a set of colors that are selectable for use in a visual marker is determined along with measures of distance between a plurality of colors of the set of colors. In some implementations, a subset of the set of colors is selected for the visual marker based on the measure of distance between colors of the subset of colors. In some implementations, an appearance of the visual marker is generated based on the subset of colors, wherein the visual marker appearance includes graphical elements encoding data using the subset of colors.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various objects, these objects should not be limited by these terms. These terms are only used to distinguish one object from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "or" as used herein refers to and encompasses any and all possible combinations of one or more of the associated listed items. It will be further understood that the terms "comprises" or "comprising," when used in this specification, specify the presence of stated features, integers, steps, operations, objects, or components, but do not preclude the presence or addition of one or more other features, integers, steps, operations, objects, components, or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations, but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method comprising:
   at an electronic device having a processor:
   determining a set of colors selectable for use in a visual marker;
   determining measures of distance between a plurality of colors of the set of colors;
   selecting a subset of colors from the set of colors for the visual marker based on distances between colors of the subset of colors exceeding a spatial distance threshold in a 3D color space; and
   generating an appearance of the visual marker based on the subset of colors, wherein the visual marker appearance comprises graphical elements encoding data using the subset of colors.

2. The method of claim 1, wherein determining the set of colors is based on an input image.

3. The method of claim 1, wherein determining the set of colors comprises:
   identifying the set of colors based on an input; and
   identifying variations of the set of colors identified based on the input for a lighting condition, printing device condition, or display device condition.

4. The method of claim 1, wherein determining the set of colors comprises:
   identifying the set of colors based on an input; and
   identifying variations of the set of colors identified based on the input for multiple lighting conditions, multiple printing device conditions, or multiple display device conditions.

5. The method of claim 1, wherein determining the set of colors comprises identifying variations based on camera calibration.

6. The method of claim 1, wherein selecting the subset of colors for the visual marker based on the distances between the colors of the subset of colors exceeding the spatial distance threshold in the 3D color space comprises selecting colors that have a maximum separation therebetween.

7. The method of claim 1, wherein the subset of colors is selected automatically without user input.

8. The method of claim 1, wherein selecting the subset of colors is further based on determining that the colors of the subset of colors are distinguishable independent of at least one of lighting conditions of the visual marker, printing or displaying conditions of the visual marker, or devices detecting the visual marker.

9. The method of claim 1, wherein selecting the subset of colors is further based on determining that the colors of the subset of colors are sufficiently differentiated to be detectable by devices sensing a printed or displayed visual marker in various lighting conditions of the deployed visual marker.

10. The method of claim 1, wherein selecting the subset of colors further comprises displaying the set of colors in an ordered sequence, wherein the set of colors is based on an input.

11. The method of claim 10, further comprising:
    receiving input selecting one color from the set of colors displayed in the ordered sequence;
    eliminating at least one additional color from the set of colors based on measures of distance to the selected one color; and
    displaying remaining colors of the set of colors in the ordered sequence.

12. The method of claim 10, further comprising:
    receiving input selecting one color from the set of colors displayed in the ordered sequence;
    eliminating at least one additional color from the set of colors based on measures of distance to the selected one color;
    displaying remaining colors of the set of colors in the ordered sequence; and
    repeating the receiving, the eliminating, and the displaying until all colors of the subset of colors are selected.

13. The method of claim 1, wherein determining the set of colors comprises:
    receiving input providing a selection of colors greater in number than the set of colors; and
    clustering the selection of colors into the set of colors.

14. The method of claim 13, further comprising:
    determining alternate subsets of the subset of colors using one color from each cluster of colors containing one corresponding color of the subset of colors.

15. The method of claim 1, wherein the subset of colors are selected anywhere within a spectrum of colors.

16. A non-transitory computer-readable storage medium, storing program instructions computer-executable on a computer to perform operations comprising:
    at an electronic device having a processor:
    determining a set of colors selectable for use in a visual marker;
    determining measures of distance between a plurality of colors of the set of colors;

selecting a subset of colors from the set of colors for the visual marker based on distances between colors of the subset of colors exceeding a spatial distance threshold in a 3D color space; and generating an appearance of the visual marker based on the subset of colors, wherein the appearance of the visual marker comprises graphical elements encoding data using the subset of colors.

17. A method comprising:

at an electronic device having a processor and a display and an input device, receiving input selecting a source image;

determining colors based on the source image and based on distances between the colors exceeding a spatial distance threshold in a 3D color space;

generating a colored visual marker and encoding data using the determined colors; and displaying a preview comprising the colored visual marker.

18. The method of claim 17, wherein determining colors based on the source image further comprises receiving input that selects at least one of the determined colors.

19. The method of claim 17, further comprising receiving input that selects a position of the colored visual marker on the source image.

20. The method of claim 17, wherein the colored visual marker encoding data is overlaid on the source image.

* * * * *